United States Patent [19]
Hickman

[11] Patent Number: 5,689,531
[45] Date of Patent: Nov. 18, 1997

[54] RECEIVER FOR A DIGITAL COMMUNICATION SYSTEM WHICH ELIMINATES CUMULATIVE JITTER

[75] Inventor: Charles Bert Hickman, Palmdale, Calif.

[73] Assignee: Unisys Corporation, Blue Bell, Pa.

[21] Appl. No.: 656,538

[22] Filed: May 31, 1996

[51] Int. Cl.$^6$ ............................ H04L 27/06; H03D 3/24
[52] U.S. Cl. .................... 375/316; 375/372; 375/376; 375/377
[58] Field of Search ........................... 375/316, 363, 375/371, 372, 376, 377; 327/156, 151; 370/516

[56] References Cited

U.S. PATENT DOCUMENTS

| | | | |
|---|---|---|---|
| 3,742,145 | 6/1973 | Clark et al. | 370/102 |
| 3,825,899 | 7/1974 | Haeberle et al. | 370/102 |
| 3,873,773 | 3/1975 | Guy et al. | 375/372 |
| 5,146,477 | 9/1992 | Cantoni et al. | 375/371 |
| 5,276,688 | 1/1994 | Urbansky | 370/102 |
| 5,359,605 | 10/1994 | Urbansky et al. | 370/102 |
| 5,438,590 | 8/1995 | Tzukerman et al. | 370/340 |
| 5,502,752 | 3/1996 | Averbuch et al. | 375/377 |

*Primary Examiner*—Tesfaldet Bocure
*Attorney, Agent, or Firm*—Charles J. Fassbender; Mark T. Starr; Steven R. Petersen

[57] ABSTRACT

An electronic receiver for a digital communication system which eliminates cumulative jitter is comprised of an input circuit which receives a continuous series of bits, on an input terminal, at a receiver input bit rate. This series of bits consists of data bits in spaced apart data blocks, with respective headers that have a variable length and fill the space between the data blocks. Also, the receiver includes an output circuit, which is coupled to the input circuit. This output circuit sends selected bits from the data blocks, but not from the headers, to an output port at a receiver output bit rate which is slower than the receiver input bit rate. Further, the output circuit includes a closed loop feedback control circuit, which selects the receiver output bit rate, such that it is substantially constant and such that the selected bits from the data blocks occur on the output port as a continuous bit stream.

16 Claims, 15 Drawing Sheets

|  | OUTPUT BR 36 | NUMERICAL EXAMPLE 37 | $b_i - b_o$/SEC 38 | NH PER SH/LH 39 |
|---|---|---|---|---|
| XMT 10 | FAST | $10^9 + 10^7 + 200$ | | |
| RP 11 | SLOW | $10^9 + 10^7 - 500$ | +700b PER SEC | 2,828 $\frac{NH}{SH}$ |
| RP 12 | SLOW | $10^9 + 10^7 - 100$ | −400b PER SEC | 4,950 $\frac{NH}{LH}$ |
| RP 13 | FAST | $10^9 + 10^7 + 250$ | −350b PER SEC | 5,657 $\frac{NH}{LH}$ |
| RP 14 | FAST | $10^9 + 10^7 + 100$ | +150b PER SEC | 13,201 $\frac{NH}{SH}$ |

FIG. 3

FIG. 4 (TRANSMITTER)

FIG. 6 (REPEATER)

FIG. 10 (RECEIVER)

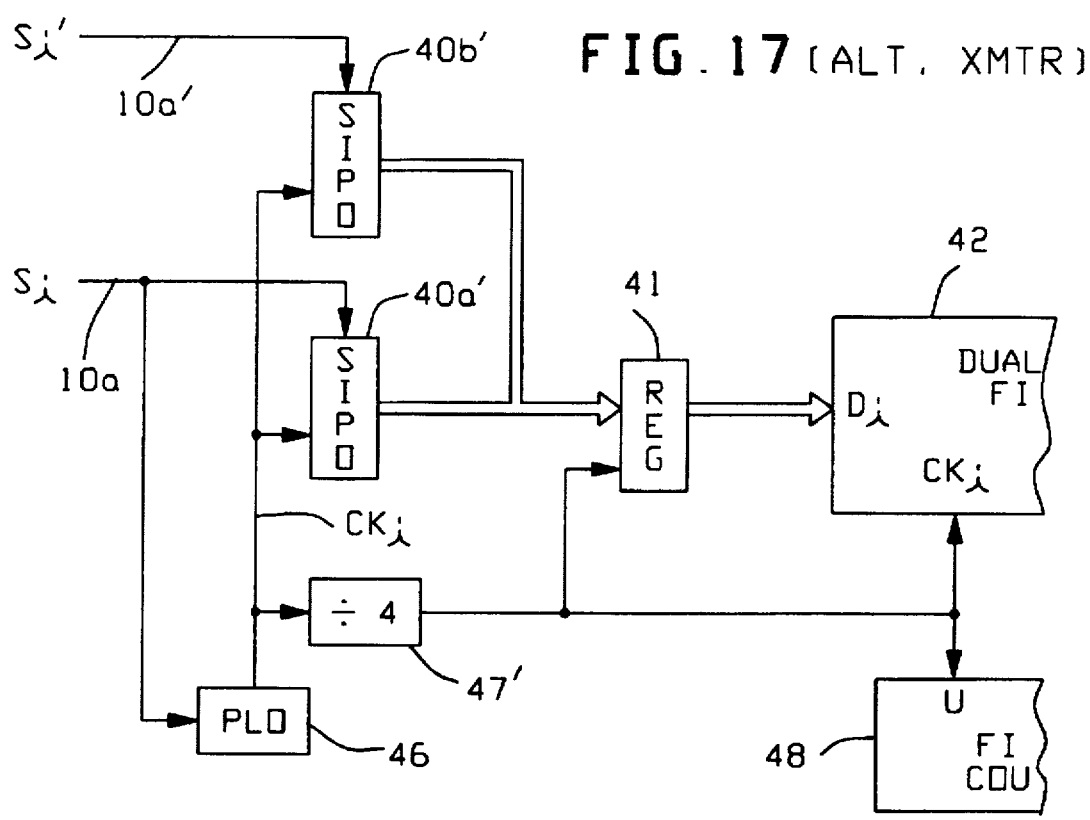
FIG. 17 (ALT. XMTR)
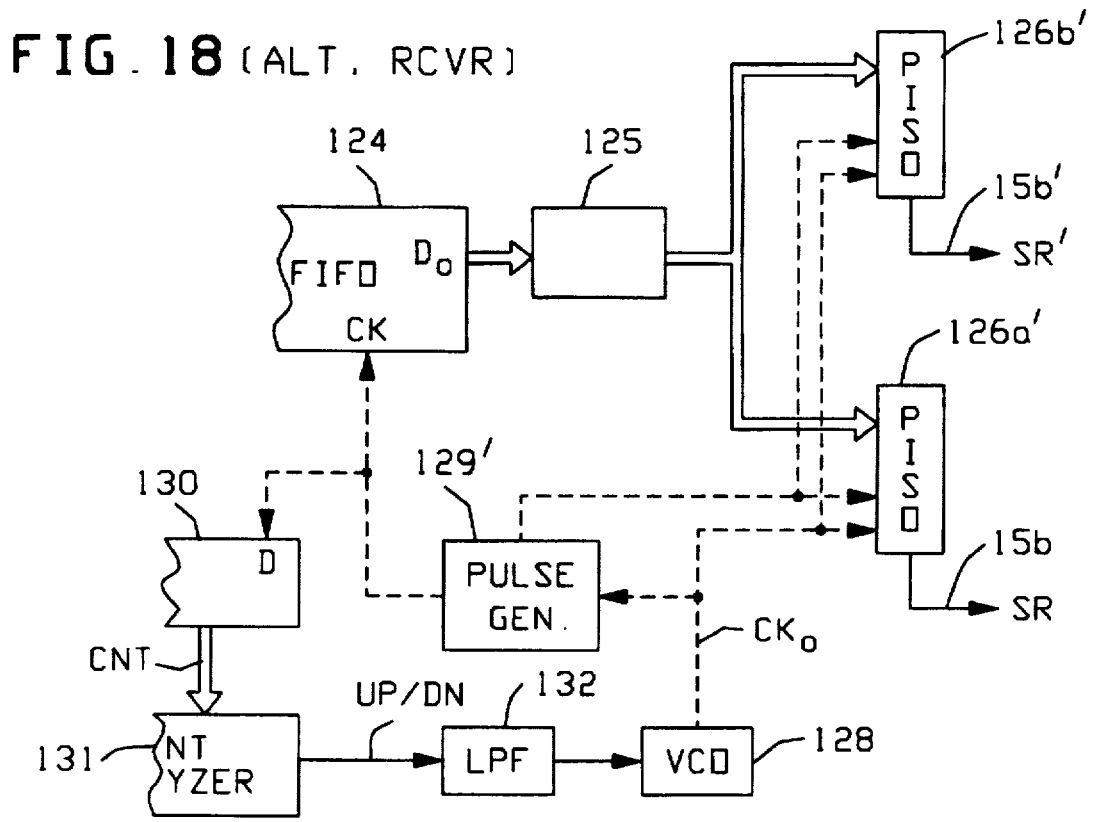
FIG. 18 (ALT. RCVR)

RECEIVER FOR A DIGITAL COMMUNICATION SYSTEM WHICH ELIMINATES CUMULATIVE JITTER

RELATED CASES

The present invention is related to three other inventions in that they all are described together with one common Detailed Description; and, they all have the same inventor, the same assignee, and the same filing date for a patent in the U.S. Patent Office. These three other related inventions are:

Docket 550,566 entitled "DIGITAL COMMUNICATION SYSTEM WHICH ELIMINATES CUMULATIVE JITTER", having U.S. Ser. No. 08/656,540 filed May 31, 1996;

Docket 550,567 entitled "TRANSMITTER FOR A DIGITAL COMMUNICATION SYSTEM WHICH ELIMINATES CUMULATIVE JITTER", having U.S. Ser. No. 08/656,541 filed May 31, 1996; and, Docket 550,568 entitled "REPEATER FOR A DIGITAL COMMUNICATION SYSTEM WHICH ELIMINATES CUMULATIVE JITTER", having U.S. Ser. No. 08/656,536 filed May 31, 1996.

BACKGROUND OF THE INVENTION

This invention relates to digital communication systems; and more particularly, it relates to digital communication systems which operate at bit rates which are so high that even small amounts of cumulative jitter will cause reception errors.

One typical prior art digital communication system to which the present invention relates includes a transmitter, multiple repeaters, and a receiver; all of which are serially coupled to each other by communication channels. In this system, a continuous series of data bits is passed from the transmitter through each of the repeaters to the receiver. To perform this operation in the prior art, the transmitter, the repeaters, and the receiver each includes a respective phase-locked oscillator which locks onto the incoming series of bits, and thereby generates clock signals that determine the time instants at which the incoming bits are regenerated on an output terminal.

However, a problem with such a prior art digital communication system is that the timing for the serial data streams within the system deviates in an uncontrolled fashion from the ideal. These uncontrolled deviations from the ideal timing are herein referred to as "jitter". This jitter can arise from a number of factors, such as: variations in power supply voltages, variations in circuit operating temperatures, noise in the communication channels, the inability of the phase-locked oscillator to perfectly track and perfectly lock onto an input series of bits; etc.

Further, in the above prior art system, the jitter problem becomes worse as the number of repeaters between the transmitter and the receiver increases because any jitter that is within the bandwidth of a phase-locked oscillator accumulates from one repeater to the next repeater. Thus, if the input series of bits to the first repeater has a slight amount of jitter due to any source of jitter in the transmitter, then the output series of bits will have a larger amount of jitter; the output series of bits from the second repeater will have an even larger amount of jitter; etc. This cumulative jitter presents a serious problem for the receiver because as it increases, the error rate which occurs in the data that is received by the receiver also increases.

Also, as the bit rate for the series of bits which passes through the communication system increases, the error rate that is caused by any fixed amount of jitter also increases. This increase in error rate occurs because as the bit rate gets faster, the time period of each bit gets shorter; and consequently, the amount of time by which clock signals from a phase-locked oscillator can vary and still be in proper synchronization with the incoming bits gets smaller. For example, in a high speed optical digital communication system which has a bit rate of $10^9$ bits per second, the time per bit is only one billionth of a second; and thus, the amount of high frequency jitter which can be tolerated before errors will occur is just a fraction of one-billionth of a second.

Jitter is often expressed in terms of having a particular amplitude at a particular frequency, where the amplitude is given as a multiple of one bit period at a certain nominal bit rate and the frequency is an oscillation frequency about that bit rate. For example, jitter in a 100 mega-bit-per-second system can be expressed as having an amplitude of 1.5 $UI_{pp}$ at 6.5 KHz, where 1.5 $UI^{pp}$ is $(1.5) \times (10$ nanoseconds$)$ and 6.5 KHz is an oscillation frequency about 100 mega-bits-per-second. This same amount of jitter in a 1000 mega-bit-per-second system is 15 $UI_{pp}$ at 6.5 KHz. In the 100 Mbps system, the jitter of 1.5 $UI_{pp}$ may be acceptable; whereas, in the 1000 Mbps system, the jitter of 15 $UI_{pp}$ may be totally unacceptable even though its absolute amplitude is unchanged.

Accordingly, the primary object of the present invention is to provide a novel digital communication system in which the above problem is overcome.

BRIEF SUMMARY OF THE INVENTION

In accordance with the present invention, a digital communication system is disclosed which includes a novel transmitter, multiple novel repeaters, and a novel receiver; all of which are serially intercoupled to each other.

One embodiment of the novel transmitter includes an input terminal on which a continuous input series of data bits is received at a constant transmitter input bit rate; and an output terminal on which a continuous output series of bits are transmitted at a transmitter output bit rate that is faster than the transmitter input bit rate. Within this output series of bits, the input series of data bits is partitioned into spaced apart blocks and a respective output header is inserted before each block. To insert the output headers, a digital logic circuit is included in the transmitter between the input terminal and the output terminal. This logic circuit generates the output headers with a variable length such that a count of the number of data bits received at the transmitter input bit rate while the headers are being inserted, minus the difference between the number of data bits transmitted at the transmitter output bit rate and received at the transmitter input bit rate when the headers are not being inserted, stays within a predetermined range.

Due to the variable length headers which are generated within the transmitter, the transmitter output bit rate can be set by clock signals from a crystal oscillator which is included within the transmitter; and this crystal oscillator can oscillate independently of the transmitter input bit rate at which the data bits are received. Consequently, the transmitter output bit rate does not need to track the transmitter input bit rate, and thus no cumulative jitter occurs in the output series of bits from the output terminal.

One embodiment of each novel repeater is comprised of an input terminal on which a continuous input series of bits is received at a repeater input bit rate; and an output terminal on which a continuous output series of bits is transmitted at a repeater output bit rate not equal to the repeater input bit rate. Both the input bit series and the output bit series consist of an interleaved sequence of headers and data blocks; but the headers in the output bit series occasionally differ from the headers that are received. To generate the output headers, a digital logic circuit is included in the repeater between the input terminal and the output terminal which occasionally adds bits to/subtracts bits from the input headers such that a count of the number of bits added minus the number of bits subtracted plus the number of bits received minus the number of bits transmitted stays within a predetermined range.

Due to this forming of the output header by occasionally adding bits to/subtracting bits from the input headers, the repeater output bit rate can be set by clock signals from a crystal oscillator within the repeater which oscillates independently of the rate at which the input series of bits is received. Consequently, the repeater output bit rate does not need to track the repeater input bit rate; and thus no cumulative jitter occurs in the output series of bits from the output terminal of each repeater.

One embodiment of the novel receiver is comprised of an input circuit which receives a continuous input series of bits at a receiver input bit rate which consists of spaced apart data blocks, each of which is preceded by a respective input header. Also, the receiver includes an output circuit, coupled to the input circuit, which sends the bits from the data blocks but not from the headers to an output terminal at a receiver output bit rate which is slower than the receiver input bit rate.

Further, this output circuit includes a closed loop feedback control circuit which selects the receiver output bit rate such that it is substantially constant and—a) the bits from the data blocks occur on the output terminal in a continuous series, and b) a count of the number of data bits sent to the output terminal when the data blocks are not being received by the input circuit, minus the difference between the number of data bits received by the input circuit and sent to the output terminal when the data blocks are being received, stays within a predetermined range. By this means, the closed loop feedback control circuit forces the receiver output bit rate to be substantially equal to the transmitter input bit rate.

BRIEF DESCRIPTION OF THE DRAWINGS

Various preferred embodiments of the present invention are described herein in the Detailed Description in conjunction with the accompanying FIGS. 1–22, wherein:

FIG. 3 is a table which shows various details about the bit series $S_o$ through $S_4$ that are respectively sent over the communication channels in the FIG. 1 system;

FIG. 17 shows a modification to the transmitter of FIG. 4 whereby multiple input series of bits are received simultaneously;

FIG. 18 shows a modification to the receiver of FIG. 10 whereby multiple bit series are output from the receiver simultaneously;

DETAILED DESCRIPTION

Figure 1:
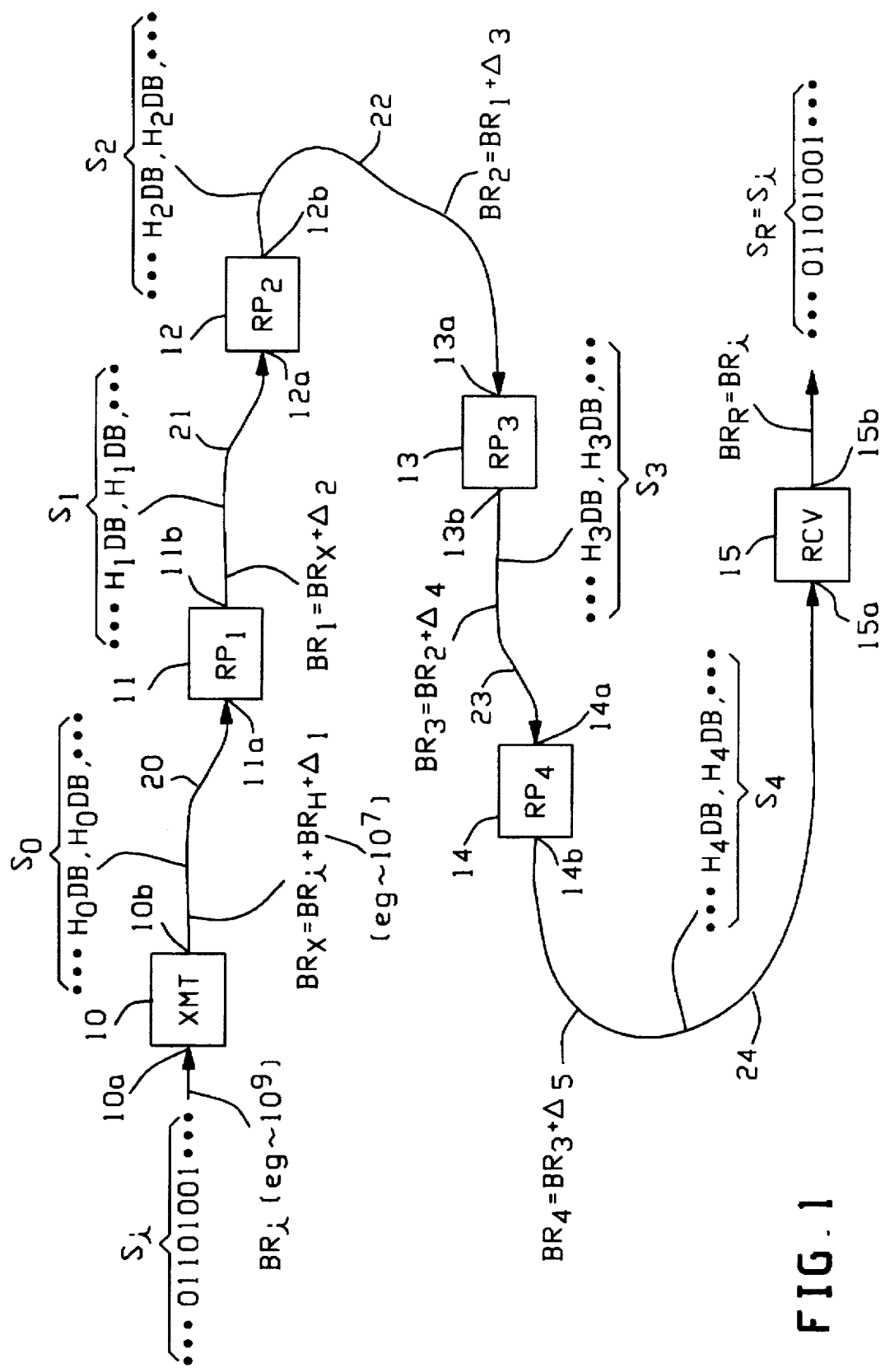
FIG. 1 shows an overview of a digital communication system which constitutes one preferred embodiment of the present invention.

Referring now to FIG. 1, a digital communication system which constitutes one preferred embodiment of the present invention will be described. This FIG. 1 communication system includes a transmitter circuit 10, four repeater circuits 11, 12, 13 and 14, and a receiver circuit 15. All of these circuits 10–15 are serially coupled to each other through respective bit-serial communication channels 20–24 as shown.

In operation, the transmitter 10 receives a continuous input series of data bits $S_i$ on an input terminal 10a; and these bits are received at a bit rate $BR_i$. This input series $S_i$ can be any sequence of 1's and 0's, and the small portion of the series which is shown in FIG. 1 is merely an example. Likewise, the bit rate $BR_i$ can be any substantially constant bit rate; and the rate of $10^9$ bits per second which is given in FIG. 1 is just one example.

While the continuous input series of data bits $S_i$ is being received, the transmitter 10 generates a different continuous output series of bits $S_o$ on an output terminal 10b. This continuous output bit series $S_o$ consists of the data bits from the input series $S_i$ divided into spaced-apart data blocks, with a fixed number of data bits per block, and a respective output header inserted before each block.

In FIG. 1, the output bit series $S_o$ is shown as . . . $H_oDB,H_oDB, . . .$ where DB indicates a data block, $H_o$ indicates an output header, and the dots indicate that the series continues. This output bit series $S_o$ occurs at a bit rate $BR_x$ which is faster than the input bit rate $BR_i$. Bit rate $BR_x$ is equal to $BR_i + BR_H + \Delta_1$ where $BR_H$ is a nominal increase in the bit rate $BR_i$ which is made so the headers can be inserted, and $\Delta_1$ is a tolerance in that nominal increase. As a numerical example, bit rate $BR_H$, is $10^7$ bits per second and $\Delta_1$ is 200 bits per second.

From output terminal 10b of the transmitter 10, the continuous output bit series $S_o$ travels to the repeater 11 where it is received on an input terminal 11a. There, the repeater 11 uses the continuous bit series $S_o$ which it is receiving to generate a different continuous series of bits $S_1$, on an output terminal 11b. This new bit series $S_1$ from the output terminal 11b is shown in FIG. 1 as ... $H_1DB,H_1DB$, ... where each DB represents one of the data blocks that is being received, each $H_1$ represents a output header from the repeater 11, and the dots indicate that the series continues.

Each output header $H_1$ is generated in the repeater 11 by occasionally adding bits to/subtracting bits from a header $H_0$ which is received on the input terminal 11a. Bits are added if the output series of bits $S_1$ occurs at a bit rate $BR_1$ which is slightly faster than the bit rate $BR_x$. Bits are subtracted if the output series of bits $S_1$ occurs at a bit rate which is slightly slower than the bit rate $BR_x$. Bit rate $BR_1$ equals the bit rate $BR_x$ plus a tolerance of $\Delta_2$ bits per second.

Each of the remaining repeaters 12, 13 and 14 operate in the same fashion as the above-described repeater 11. Thus, from output terminal 11b of the repeater 11, the continuous series of bits $S_1$ travels to the repeater 12 where it is received on an input terminal 12a. There, the repeater 12 uses the series of bits $S_1$ which it is receiving to transmit a different continuous output series of bits $S_2$ on an output terminal 12b. Bit series $S_2$ is shown in FIG. 1 as ... $H_2DB,H_2\ DB$ ... where each DB represents a data block that is received, each $H_2$ represents an output header which is generated in the repeater 12 by occasionally adding bits to/subtracting bits from a header $H_1$ that is received, and the dots indicate that the series continues. Bit series $S_2$ occurs at a bit rate $BR_2$ which equals the bit rate $BR_1$ plus a tolerance of $\Delta_3$ bits per second.

Similarly, from output terminal 12b of the repeater 12, the continuous series of bits $S_2$ travels to the repeater 13 where it is received on an input terminal 13a. Repeater 13 then uses the series of bits $S_2$ which it is receiving to transmit a different continuous output series of bits $S_3$ on an output terminal 13b. This series $S_3$ equals ... $H_3DB,H_3DB$ ... where each DB is a data block that is received, each $H_3$ is an output header which is generated in the repeater 13 by occasionally adding bits to/subtracting bits from the headers $H_2$ that are received, and the dots indicate that the series continues. Bit series $S_3$ occurs at a bit rate $BR_3$ which equals bit rate $BR_2$ plus a tolerance of $\Delta_4$ bits per second.

Likewise, the continuous series of bits $S_3$ travels from the repeater 13 to the repeater 14 where it is received on an input terminal 14a. Repeater 14 then uses the series of bits $S_3$ to transmit a different continuous output series of bits $S_4$ on an output terminal 14b. Bit series $S_4$ is shown in FIG. 1 as ... $H_4DB,H_4DB$ ... where each DB is a data block that is received, and each $H_4$ is an output header which is generated in the repeater 14 by occasionally adding bits to/subtracting bits from the received headers $H_3$. Bit series $S_4$ occurs at a bit rate $BR_4$ which equals $BR_3$ plus a tolerance of $\Delta_5$ bits per second.

From the repeater 14, the continuous series of bits $S_4$ travels to an input terminal 15a on the receiver 15. Then, the receiver 15 uses the series of bits $S_4$ that it is receiving to transmit a continuous output series of bits $S_R$ on an output terminal 15b which is identical to input series of bits $S_i$ to the transmitter 10. To generate the bit series $S_R$, the receiver 15 strips the headers $H_4$ from the bit series $S_4$ which it receives; and it sends the remaining data bits to output terminal 15b at a bit rate $BR_R$ which is substantially the same as bit rate $BR_i$. Consequently, the two series of bits $S_R$ and $S_i$ are essentially identical in both their bit values and their speed of occurrence.

Now, consider in further detail the two series of bits $S_i$ and $S_o$ which respectively are received by and transmitted from the transmitter 10. Bit series $S_i$ to the transmitter input occurs at a bit rate $BR_i$, whereas bit series $S_o$ from the transmitter output occurs at a faster bit rate $BR_x$ which equals $BR_i + BR_H + \Delta_1$. Due to the bit rate increase of $BR_H$, the headers Ho can be inserted before each data block DB in the series $S_o$ such that the data bits from the input series $S_i$ do not continually accumulate inside of the transmitter 10.

For example, when the bit rate $BR_i$ is $10^9$ bits per second and the bit rate $BR_x$ is $10^9 + 10^7$ bits per second, a total of $10_7$ extra bits are sent from the transmitter every second in comparison to the number of bits which the transmitter receives. By keeping the ratio $BR_x \div BR_i$ equal to the total number of bits per header and data block divided by the number of bits per data block, the bits in the input series $S_i$ will not accumulate within the transmitter 10 over time. For the case where $BR_x = 10^9 + 10^7$ and $BR_i = 10^9$, the above ratio is satisfied by an output series $S_o$ which has one hundred bytes in the data block for each byte in the header.

Next, consider in further detail the tolerance terms $\Delta_1$ through $\Delta_5$ which respectively occur in the bit rates $BR_x$ through $BR_4$. Due to these tolerance terms, the respective bit rates of the bit series $S_o$ through $S_4$ do not track each other; but instead, they are independent of each other. For example, the tolerance term $\Delta_2$ makes the bit rate $BR_1$ of the series $S_1$ independent of the bit rates for the remaining series $S_o$, $S_2$, $S_3$, and $S_4$.

This independence of the respective bit rates $BR_x$ through $BR_4$ is important because it enables those bit rates to be set by respective crystal oscillators within the transmitter 10 and each of the repeaters 11–14. Each such oscillator generates clock signals that send the output headers and data blocks to a respective output terminal 10b–14b independently of the bit rate at which bits are received on the corresponding input terminals 10a–14a. By generating these clock signals with the crystal oscillator, as opposed to a phase locked oscillator which attempts to track the frequency of the input series of bits that is received, jitter caused by phase locking is completely eliminated in the series of bits that are sent from the output terminals 10b–14b.

Figure 2:
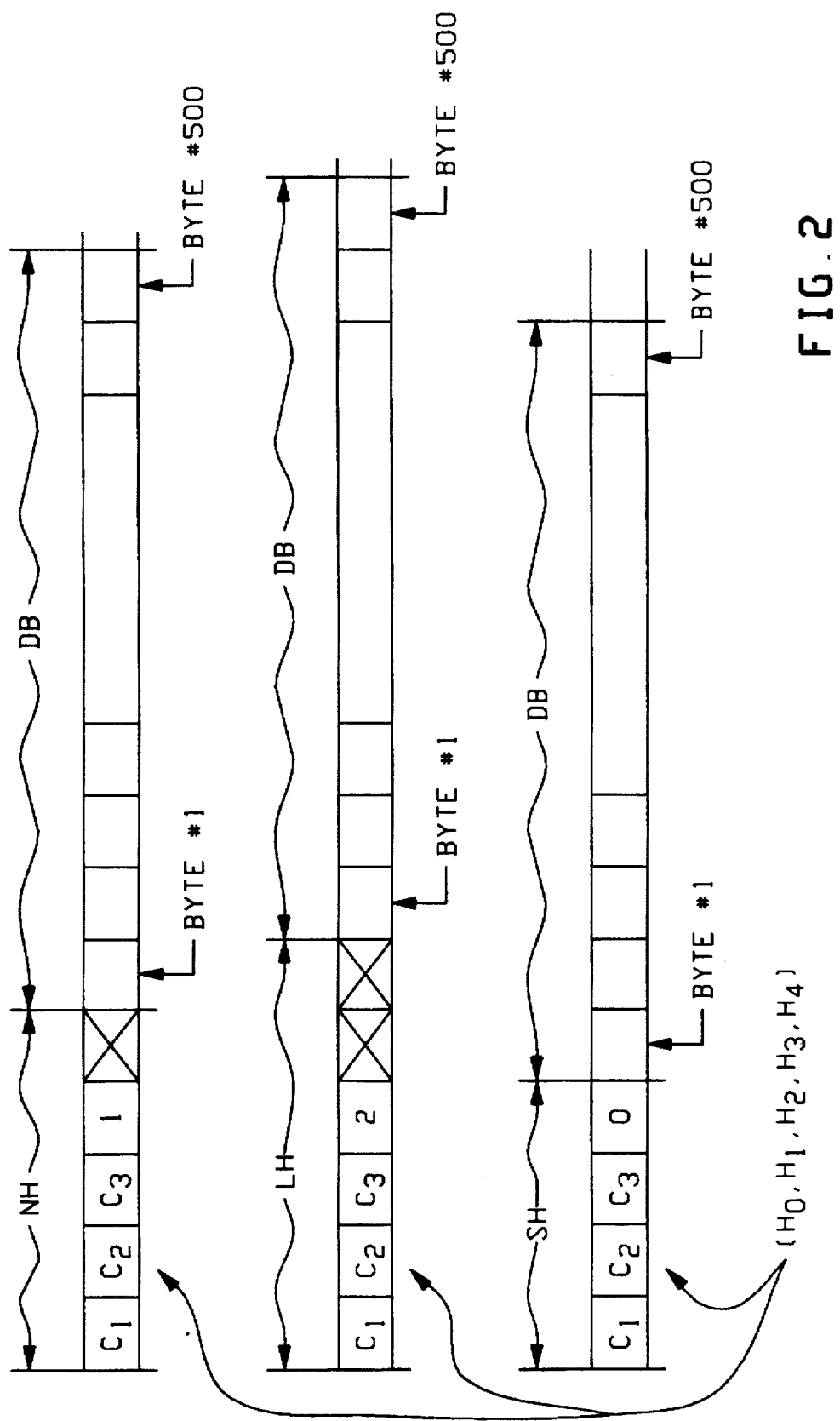
FIG. 2 shows one format by which respective bit series $S_o$ through $S_4$ are sent in a serial fashion over the communication channels in the FIG. 1 system.

In order to accommodate the bit rate tolerances $\Delta_1$ through $\Delta_5$, the headers $H_o$ through $H_4$ are generated in the transmitter 10 and repeaters 11–14 with three different lengths; and these different length headers, along with a data block DB which follows each header, is shown in FIG. 2. There, NH indicates a normal length header; LH indicates a long header; and SH indicates a short header. A normal length header NH consists of five bytes which in FIG. 2 are represented by five squares. A long header consists of six bytes which in FIG. 2 are represented by six squares; and a short header consists of four bytes which in FIG. 2 are represented by four squares.

Within the normal header NH and the long header LH and the short header SH, the first three bytes are labeled $C_1$, $C_2$, and $C_3$. These three bytes together constitute a predetermined code which identifies the start of the header. Also in the normal header NH and the long header LH and the short header SH, the fourth byte contains a number. A normal header is identified by the number "1"; a long header is identified by the number "2"; and a short header is identified by the number "0." Following the number "1" in a normal header is one dummy byte which in FIG. 2 is represented by an "X"; and following the number "2" in a long header are two dummy bytes which in FIG. 2 are represented by two "Xs". No dummy bytes follow the "0" in a short header.

At any one time instant, each of the headers $H_0$, $H_1$, $H_2$, $H_3$, and $H_4$ which respectively occur in the bit sequences $S_0$ through $S_4$ can be either a normal header, a long header, or a short header. For example, at one time instant, the headers $H_0$, $H_1$, $H_2$, $H_3$, and $H_4$ can respectively be normal, normal, short, normal, and normal; whereas at another time instant, the headers $H_0$, $H_1$, $H_2$, $H_3$, and $H_4$ can respectively be normal, long, normal, normal and normal. This point will now be further explained by a specific example which is shown in FIG. 3.

FIG. 3 is in the form of a table which has five rows 31–35 and four columns 36–39. Row 31 contains information which relates to the transmitter 10; row 32 contains information which relates to the repeater 11; row 33 contains information which relates to the repeater 12; row 34 contains information which relates to the repeater 13; and row 35 contains information which relates the repeater 14.

Column 36 indicates whether the respective output bit rate from the transmitter 10 and the repeaters 11–14 is fast or slow relative to a nominal bit rate where all of the tolerances $\Delta_1$, through $\Delta_5$ are zero. One specific numerical example of these fast or slow bit rates is given in column 37. In this example, transmitter 10 is running fast by +200 bits per second; repeater 11 is running slow by −500 bits per second; repeater 12 is running slow by −100 bits per second; repeater 13 is running fast by +250 bits per second; and repeater 14 is running fast by +100 per second.

Column 38 gives the difference between the number of bits which are received by each repeater and transmitted from the repeater for each second of operation. For the repeater 11, seven hundred more bits are received than are transmitted; for the repeater 12, four hundred more bits are transmitted than are received; for the repeater 13, three hundred fifty more bits are transmitted than are received; and for the repeater 14, one hundred fifty more bits are received than are transmitted.

In those cases where more bits are received than are transmitted, the short headers SH are occasionally generated on the output terminal so that more time is available to retransmit the data bits in the data blocks that are being received. Conversely, in those cases where more bits are being transmitted on the output terminal than are being received, the long headers are occasionally generated so that more time is available to accumulate the data bits in the data blocks for retransmission.

This occasional generation of a long header or a short header is shown in column 39 which lists the ratio of the number of normal headers per short header, and the number of normal headers per long header. Each of the entries in column 39 is derived by using five hundred bytes per data block and five bytes per normal header as shown in FIG. 2.

Inspection of FIG. 3 shows that when the output bit rate of a repeater is slow, that repeater may occasionally need to generate either a short header or a long header on its output terminal. For example, the slow repeater 11 in row 32 occasionally generates a short header; whereas the slow repeater 12 in row 33 occasionally generates a long header. Likewise, when the output bit rate of a repeater is fast, that repeater may occasionally need to generate either a long header or a short header; and this is illustrated by the entries in the rows 34 and 35.

Figure 4:
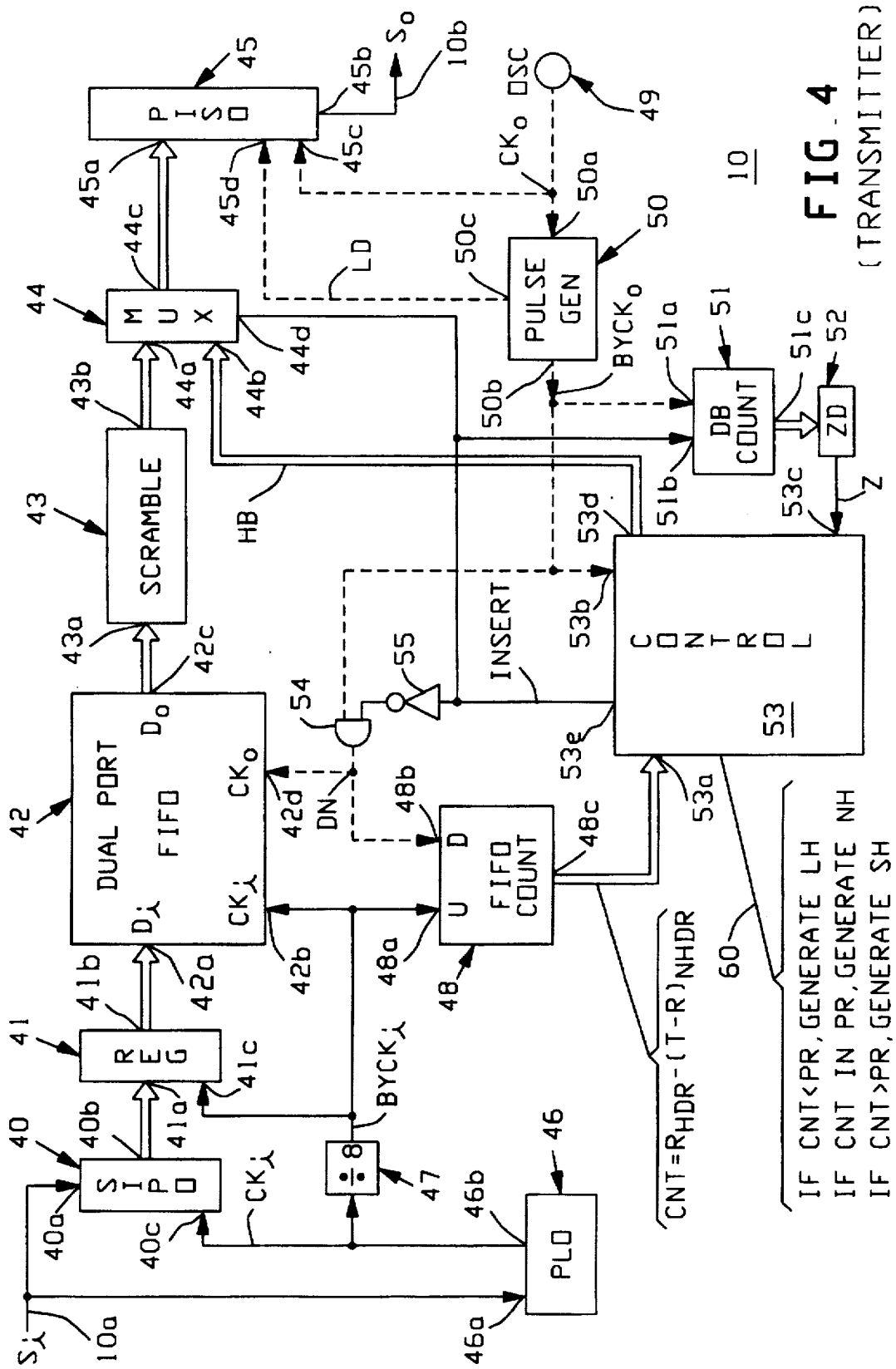
FIG. 4 is a detailed logic diagram of one preferred embodiment for the transmitter in the FIG. 1 system.

Turning now to FIG. 4, a circuit which constitutes one preferred embodiment of the transmitter 10 will be described. This FIG. 4 embodiment includes several circuit components 40–55, and each component is described below in TABLE 1.

TABLE 1

(Transmitter Components)

| ITEM | DESCRIPTION |
|------|-------------|
| 40..... | Component 40 is a serial-in, parallel-out register which has a serial input 40a; a parallel output 40b, and a clock input 40c. Register 40 holds a total of eight bits (one byte). On the rising edge of each clock pulse that is received on the clock input 40c, one bit is loaded into register 40 from input terminal 40a, and the last seven bits which were previously loaded from input 40a are shifted within register 40 by one bit position. |
| 41..... | Component 41 is a register which has a byte-wide input 41a, a byte-wide output 41b, and a clock input 41c. One byte is loaded into register 41 each time the rising edge of a clock pulse occurs on the clock input 41c. |
| 42..... | Component 42 is a dual port, first-in, first-out, memory ("FIFO"). Memory 42 has a byte-wide input port 42a, a write control input 42b, a byte-wide output port 42c, and a read control input 42d. One byte is loaded into the memory 42 each time the rising edge of a pulse is received on input 42b. All bytes which are loaded into the memory 42 travel within the memory to the output port 42c in the same order in which they are loaded. A different byte is sent to the output port 42c each time the rising edge of a pulse occurs on input 42d. Memory 42 holds a total of sixteen bytes. |
| 43..... | Component 43 is a digital scrambler circuit which has a byte-wide input 43a and a byte-wide output 43b. Each byte which is received on the input is presented on the output in a scrambled fashion. Due to this scrambling operation, the bits which occur on output 43b are randomized. Consequently the probability of those bits matching the predetermined code $C_1$ $C_2$ $C_3$ which occurs in the headers of FIG. 2 approaches zero; and, any DC component in the transmitted bit series $S_0$ is minimized. |
| 44..... | Component 44 is 2X1 multiplexer which has two byte wide inputs 44a and 44b, one byte wide output 44c, and a control input 44d. A byte is transferred from input 44a to output 44c when a control signal INSERT on input 44d is false; and a byte is transferred from input 44b to output 44c when the control signal INSERT is true. |
| 45..... | Component 45 is a parallel-in, serial-out register which has a parallel input 45a, a serial output 45b, a clock input 45c, and a load control input 45d. One byte is loaded into register 45 each time the rising edge of a clock pulse occurs on input 45c while a LD signal on input 45d is true. That byte is shifted within register 45 by one bit position to output terminal 45b each time the rising edge of a clock pulse occurs on input 45c while the LD signal is false. |
| 46..... | Component 46 is phase locked oscillator (PLO) which has one input 46a and one output 46b. |

TABLE 1-continued

(Transmitter Components)

| ITEM | DESCRIPTION |
|---|---|
|  | Input 46a receives the continuous input series of data bits $S_i$ from terminal 10a; and the phase locked oscillator 46 internally has a phase locked loop which locks on to the bit series $S_i$ and thereby generates a clock signal $CK_i$ on output 46b at nearly the same bit rate as the input bit series $S_i$. |
| 47...... | Component 47 is a divide by eight counter which generates a byte clock $BYCK_i$ on its output terminal by dividing the clock signal $CK_i$ from the phase locked oscillator by eight. |
| 48...... | Component 48 is a counter which has two inputs 48a and 48b, and one output 48c. Each time a pulse is received on input 48a, the counter 48 counts up by one; and each time a pulse is received on input 48b, the counter 48 counts down by one. Output 48c provides the result of this up and down counting with the signal CNT. |
| 49...... | Component 49 is a crystal oscillator that has one output on which the clock $CK_o$ is generated. Since component 49 is a crystal oscillator, the clock signal $CK_o$ is very stable and has essentially no jitter. Clock signal $CK_o$ occurs at the previously described bit rate $BR_x$ which equals $BR_i+BR_H+\Delta_1$. Here, the term $\Delta_1$ enables the oscillator 49 to have a frequency tolerance which can arise due to a variety of factors such as tolerances in manufacturing, operating temperature, supply voltage, etc. Preferably the tolerance term $\Delta_1$ is no more than plus or minus two parts per million. |
| 50...... | Component 50 is a pulse generator which has one input 50a, and two outputs 50b and 50c. Input 50a receives clock signal $CK_o$, and output 50b generates byte clock pulses $BYCK_o$ which occur at one-eighth the frequency of the clock signal $CK_o$. Each pulse $BYCK_o$ lasts for one cycle of clock $CK_o$; and during the next cycle of clock $CK_o$, a load pulse LD is generated on output 50c. |
| 51...... | Component 51 is counter which has a clock input 51a, a reset input 51b and an output 51c. Each time the rising edge of a clock pulse is received on input 51a while a control signal INSERT on input 51b is true, the counter 51 initializes itself to the number of bytes per data block. That initial count is decremented by one each time the rising edge of a clock signal is received on input 51a while the control signal INSERT is false; and the resulting count occurs on the output 51c. |
| 52...... | Component 52 is a zero detect circuit. When the count from counter 51 is zero, component 52 generates a control signal Z in a true state; whereas when the count from counter 51 is not zero, component 52 generates the signal Z in a false state. |
| 53...... | Component 53 is a sequential control circuit which has three inputs 53a–53c, and two outputs 53d–53e. Input 53a receives the count signals CNT from counter 48; input 53b receives the byte clock $BYCK_o$ from pulse generator 50; and input 53c receives the signal Z from the zero detect circuit 52. In response to these three inputs, control circuit 53 generates the headers $H_o$, one byte at a time, as the signal HB on output 53d. Also, control circuit 53 generates the control signal INSERT on output 53e which indicates when the header bytes HB are to be inserted. |
| 54...... and 55 | Component 54 is a digital AND gate, and component 55 is a digital inverter. When the INSERT control signal is false, component 54 generates a down pulse DN for each cycle of the byte clock $BYCK_o$; whereas when the INSERT signal is true, component 54 generates no DN pulses. |

All of the components 40–55 within the transmitter 10 are intercoupled to each other as shown in FIG. 4; and how those components interact will now be described in conjunction with FIGS. 4 and 5. Within the transmitter 10, the input series of data bits $S_i$ sequentially passes from the input terminal 10a through the components 40, 41, 42, 43, 44, and 45 to the output terminal 10b. Passage of the input series of data bits through the registers 40 and 41 and into the FIFO 42 occurs in response to the clock signals $CK_i$ and $BYCK_i$; whereas passage of those data bits from the FIFO 42 through the scrambler 43, the multiplexer 44, and the parallel-in, serial-out register 45 occurs in response to the clock signals $CK_o$ and $BYCK_o$.

Inspection of the input portion of the FIFO 42 in FIG. 4 shows that clock input 42b receives an uninterrupted clock signal $BYCK_i$; and consequently, one byte of data is loaded into the FIFO 42 for each cycle of the clock $BYCK_i$. By comparison, inspection of the output portion of the FIFO 42 shows that clock input 42d receives a byte clock $BYCK_o$ which is inhibited when the control signal INSERT is true. Consequently, when the INSERT signal is true, the amount of data which is stored within the FIFO 42 builds up.

To generate the INSERT control signal, the control circuit 53 monitors the signal Z from the zero detect circuit 52. When signal Z goes true, the last byte of a data block is being sent from register 45. In response, control circuit 53 generates the INSERT signal in a true state; and that causes the header bytes HB to pass from the control circuit output 53d through multiplexer 44 and into register 45. Control circuit 53 continues to generate the INSERT signal in a true state until the last byte of the header has been inserted into register 45; and then control circuit 53 generates the INSERT signal in a false state.

Normally, control circuit 53 sends a total of five header bytes HB through the multiplexer 44 to the register 45; and this is accomplished by generating the INSERT control signal in a true state for a total of five cycles of the byte clock $BYCK_o$. However, if too much data has accumulated in the FIFO 42 from the input terminal 10a, then control circuit 53 responds by generating a short header rather than a normal header. Conversely, if not enough of data is being stored in the FIFO 42, then control circuit 53 responds by generating a long header.

Each time a byte is loaded into the FIFO 42, the counter 48 counts up by one; and each time a byte is removed from the FIFO 42, the counter 48 is decremented by one. By monitoring the count signal CNT from the FIFO counter 48, the control circuit 53 determines whether to generate a normal header, or a long header, or a short header.

If the count CNT from counter 48 is within a predetermined range PR, then control circuit 53 generates a normal header. If the count CNT from counter 48 is less than the predetermined range PR, then control circuit 53 generates a long header. If the count CNT from counter 53 is greater than the predetermined range PR, then control circuit 54 generates a short header. This operation of control circuit 53 is indicated in FIG. 4 by reference numeral 60.

To generate a short header, control circuit 53 sends four header bytes HB on its output terminal 53d and it generates the INSERT control signal in a true state during four cycles of the byte clock $BYCK_o$. To generate a long header, control circuit 53 sends six header bytes HB on its output 53d, and it generates the INSERT control signal in a true state for a total of six cycles of the byte clock $BYCK_o$.

Figure 5:
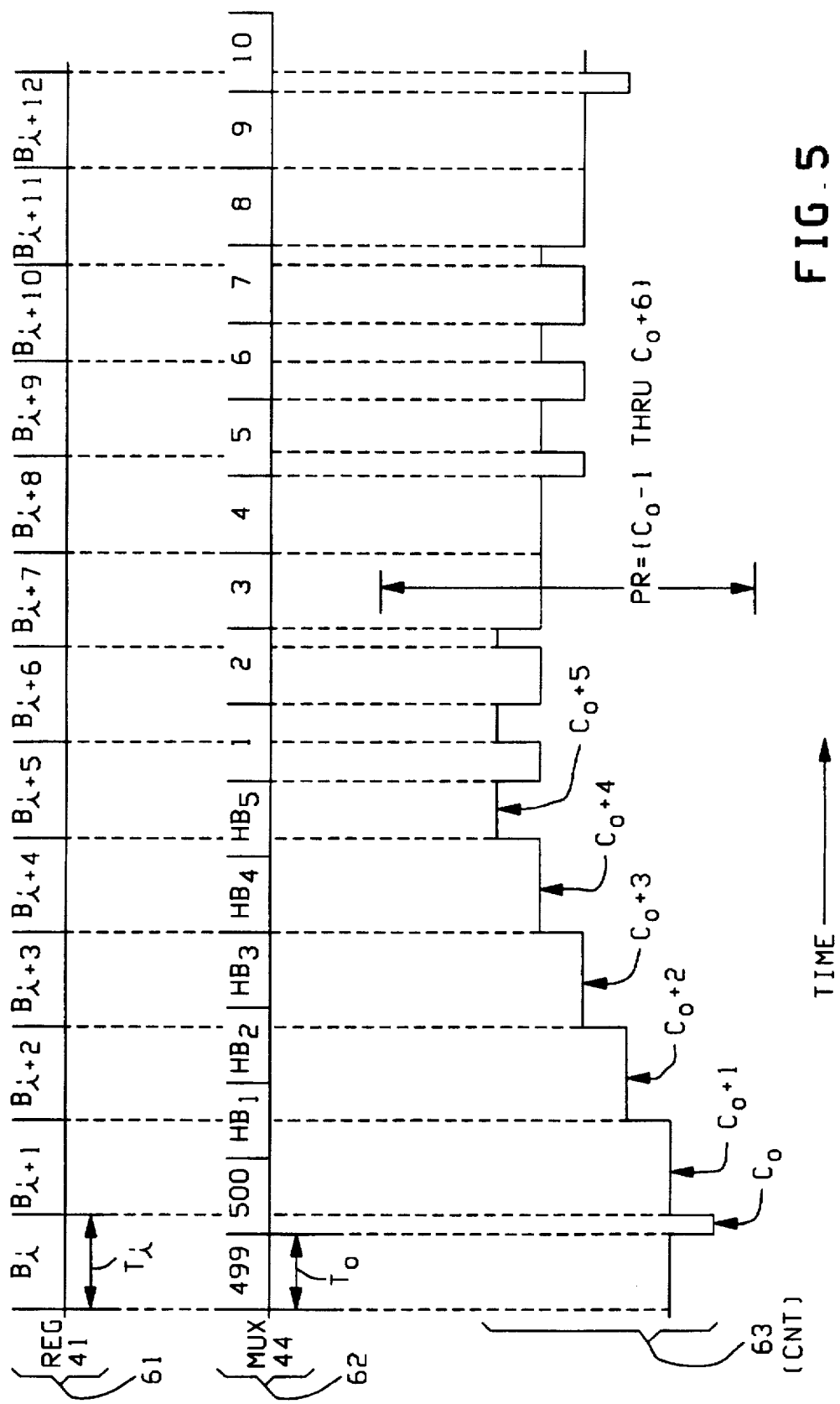
FIG. 5 is a timing diagram which illustrates an operation in the transmitter in FIG. 4.

How some of the above-described signals vary as a function of time within the transmitter 10 can be seen in FIG. 5. There, waveform 61 shows the content of register 41; waveform 62 shows the output of multiplexer 44; and waveform 63 shows the count signal CNT from the counter 48. In FIG. 5, the first byte in register 41 is labeled $B_i$; the next byte is labeled $B_i+1$; etc. A different byte is loaded into register 41 at the start of each byte clock $BYCK_i$; and thus register 41 holds each byte for a time period $T_i$ which is the reciprocal of the byte clock $BYCK_i$.

Also in FIG. 5, the first byte from multiplexer 44 is shown as byte number 499 in a data block of 500 bytes; and the next byte is shown as byte number 500. Then, the next five bytes from the multiplexer 44 are bytes $HB_1-HB_5$ which constitute the bytes of a normal header. Then, the next byte from multiplexer 44 is the first byte of a data block; the next byte from the multiplexer 44 is the second byte of the data block; etc. A different byte is sent from the multiplexer at the start of each cycle of the byte clock $BYCK_o$; and thus each byte from the multiplexer lasts for a time period $T_o$ which is the reciprocal of the byte clock $BYCK_o$.

During the time period that the header bytes $HB_1-HB_5$ are being sent from multiplexer 44, the counter 48 is incremented but it is not decremented. This is shown in FIG. 5 wherein the counter 48 is incremented five times from an initial count of $C_0$ to $C_0+5$. Thereafter, when the header bytes are not being sent from the multiplexer 44, the counter 48 is incremented by the byte clock $BYCK_i$, and the counter 48 is decremented by the down pulses DN. Over time, the net effect of this incrementing and decrementing is that the counter 48 counts down because the down pulses DN occur at a faster rate than byte clock $BYCK_i$. This effect can be seen in the portion of the CNT signal which occurs in FIG. 5 after the last header byte $H_5$.

By monitoring the count signal CNT from the FIFO counter 48, the control circuit 53 is able to keep that count within the predetermined range PR. In FIG. 5, the predetermined range is shown as $C_0-1$ through $C_0+6$ as one example. If the count CNT falls below $C_0-1$, then control circuit 53 generates a long header for a data block; and that causes the count CNT to increment one more time. Conversely, if the count signal CNT rises above $C_0+6$, then control circuit 53 generates a short header for a data block; and that causes the count CNT to increment one less time.

Next, with reference to FIG. 6, a circuit which constitutes one preferred embodiment of each repeater 11–14 will be described. For simplicity in FIG. 6, only the bit series $S_0$ and $S_1$ which occur in the repeater 11 are shown. This FIG. 6 embodiment includes several circuit components, and each component is described below in TABLE 2.

TABLE 2

(Repeater Components)

| ITEM | DESCRIPTION |
|---|---|
| 70..... | Component 70 is a serial-in, parallel-out register which has a serial input 70a, a |

TABLE 2-continued (Repeater Components)

| ITEM | DESCRIPTION |
|---|---|
| | parallel output 70b, and a clock input 70c. Register 70 holds a total of eight bits (one byte). On the rising edge of each clock pulse that is received on input 70c, one bit is loaded into register 70 from the input terminal 70a, and the last seven bits which were previously loaded from input 70a are shifted within register 70 by one bit position. |
| 71..... 72, & 73 | Each of the components 74, 72 and 73 is a one byte register. Each register has a one byte input, a one byte output, and a clock input. One byte is loaded into each register when the rising edge of a clock pulse occurs on the clock input. |
| 74..... | Component 74 is 2X1 multiplexer. Component 74 has two byte-wide inputs 74a and 74b, one byte-wide output 74c, and a control input 74d. Data is transferred from the input 74a to the output 74c when a control signal INSERT on input 74d is false; and data is transferred from the input 74b to the output 44c when the control signal INSERT is true. |
| 75..... | Component 75 is a dual port, first-in, first-out, memory (FIFO). Memory 75 has a byte-wide input 75a, a write control input 75b, a byte-wide output 75c, and a read control input 75d. One byte is loaded into the memory 75 each time the rising edge of a pulse is received on input 75b. All bytes which are loaded into the memory 75 travel within the memory to the output 75c in the same order in which they are loaded. A different byte is sent to the output 75c each time the rising edge of a pulse occurs on input 75d. Memory 75 holds a total of sixteen bytes. |
| 76..... | Component 76 is a parallel-in, serial-out register which has a parallel input 76a, a serial output 76b, a clock input 76c, and a load control input 76d. One byte is loaded into register 76 each time the rising edge of a clock pulse occurs on input 76c while a LD signal on input 76b is true. That byte is shifted within register 76 by one bit position to the output terminal 76d each time the rising edge of a clock pulse occurs on input 76c while the LD signal is false. |
| 77..... | Component 77 is phase locked oscillator (PLO) which has one input 77a, and two outputs 77b and 77c. Input 77a receives the continuous input series of data bits $S_o$ from terminal 11a; and the phase locked oscillator 77 internally has a phase locked loop which locks on to the bit series $S_o$ and thereby generates a clock signal $CK_i$ on output 77b at nearly the same bit rate as the input bit series $S_i$. Oscillator 77 also searches for the code $C_1 C_2 C_3$ that occurs in each of the headers; and it generates a byte clock $BYCK_i$ on output 77c which is synchronized with that code and occurs once for every eight cycles of the bit clock $CK_i$. |
| 78..... | Component 78 is a crystal oscillator that has one output on which an output clock $CK_o$ is generated. Since component 78 is a crystal oscillator, the clock signal $CK_o$ is very stable and has essentially no jitter. Clock signal $CK_o$ occurs at the previously described bit rate $BR_1$ which equals $BR_n+\Delta_2$. Here, the tolerance term $\Delta_2$ enables the oscillator 78 to have a frequency tolerance which can arise due to a variety of factors, such as tolerances in manufacturing, operating temperature, supply voltage, etc. Preferably, the tolerance term $\Delta_2$ is no more than plus or minus two parts per million. |

TABLE 2-continued

(Repeater Components)

| ITEM | DESCRIPTION |
|------|-------------|
| 79..... | Component 79 is a pulse generator which has two inputs 79a and 79b, and two outputs 79c and 79d. Input 79a receives clock signal $CK_o$ and input 79b receives an enable signal EN. When the EN signal is false, the outputs 79c and 79d are at a constant "0." When the EN signal is true, output 79c generates byte clock pulses $BYCK_o$ which occur at one-eighth the frequency of the clock signal $CK_o$. Each clock pulse $BYCK_o$ has lasts for one cycle of clock $CK_o$; and during the next cycle of clock $CK_o$, a load pulse LD is generated on output 79d. |
| 80..... | Component 80 is a clocked D-type flip-flop. Component 80 has an output Q which sets to a "1" when a rising edge of the clock $BYCK_o$ is received, and which resets to a "0" when a down pulse DN is received. |
| 81..... | Component 81 is an edge triggered one-shot which has an enable input E and a clock input CK. Component 81 generates a down pulse DN if the enable input E is a "1" when the rising edge of a sample pulse SAMPLE occurs on the clock input CK. Component 81, together with component 80, generate one DN pulse for each cycle of the output byte clock $BYCK_o$; and each DN pulse is synchronized to the input byte clock $BYCK_i$. |
| 82..... | Component 82 is a counter which has two inputs 82a and 82b, and one output 82c. Each time the rising edge of a pulse UP is received on the input 82a, the counter 82 counts up by one; and each time the rising edge of a pulse DN is received on the input 82b, the counter 82 counts down by one. Output 82c provides the net result of this up and down counting by the signal CNT. |
| 83..... | Component 83 is a sequential control circuit which has three inputs 83a–83c, and five outputs 83d–83h. Input 83a receives the count signals CNT from counter 82; input 83b receives the byte clock $BYCK_i$ from the phase locked oscillator 77; and input 83c receives the bytes from register 71. In response to these three inputs, control circuit 83 generates the headers $H_1$ one byte at a time as signal HB on the output 83d. Also, control circuit 83 generates the INSERT signal on output 83e which controls when the header bytes HB are to be inserted. Further, control circuit 83 generates the UP pulses on output 83d which go to the counter 83 and the FIFO 75. In addition, control circuit 83 generates the SAMPLE pulses on output 83g which trigger the one-shot circuit 81. Also, control circuit 83 generates the EN signal which enables the pulse generator 79. |

Figure 6:
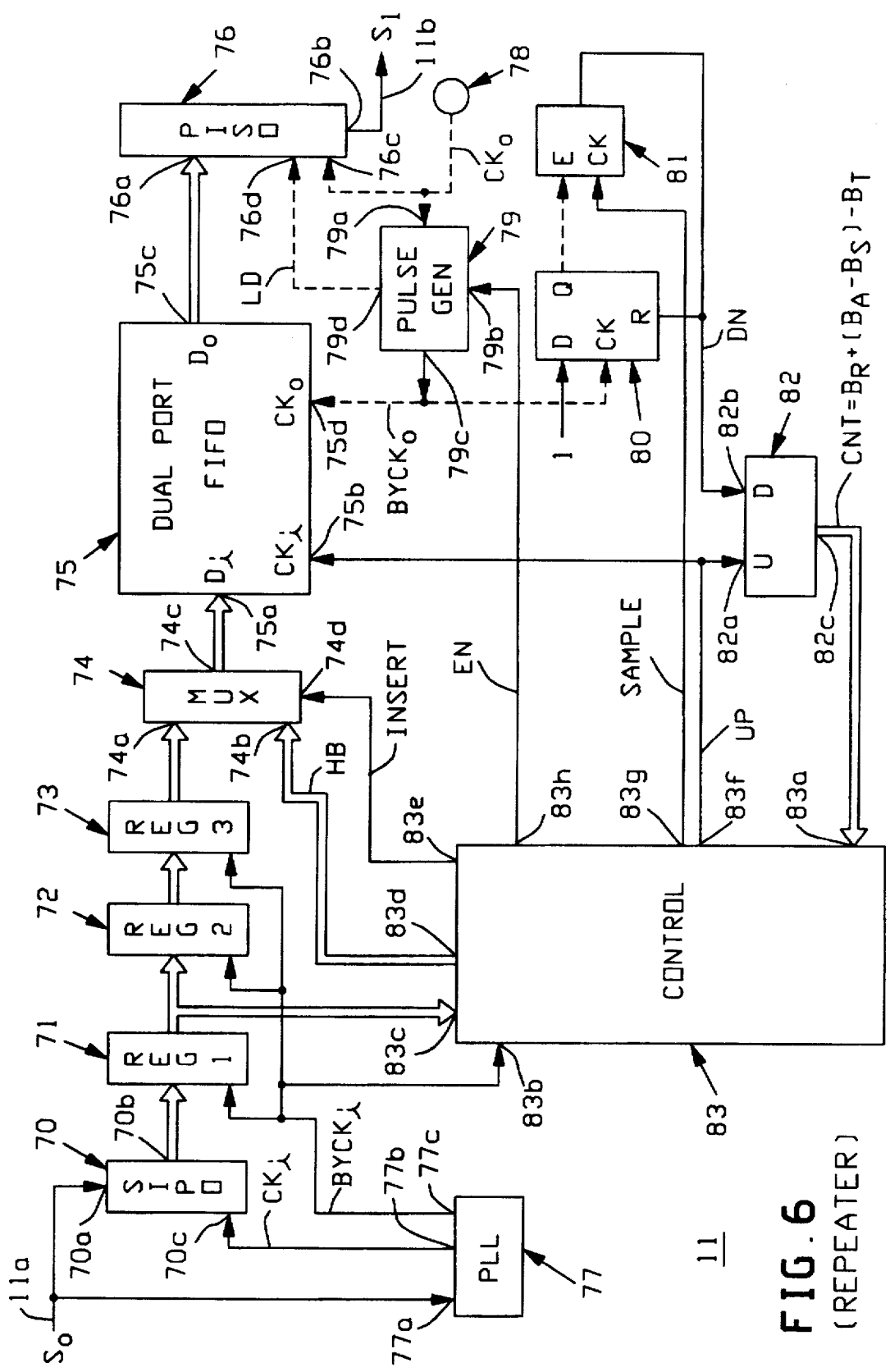
FIG. 6 is a detailed logic diagram of a preferred embodiment for each of the repeaters in the FIG. 1 system.

All of the components 70–83 within the repeater 11 are intercoupled to each other as shown in FIG. 6; and how those components interact with each other will now be described. From input terminal 11a, the bit series $S_o$ travels to the serial-in parallel-out register 70; and from there, the bits are transferred one byte at a time through the registers 71, 72 and 73. This transfer occurs in synchronization with the byte clock $BYCK_i$ which is generated by the phase locked loop 77.

Each byte in register 71 is examined by the sequential control circuit 83 to determine when a header is being received, since the start of each header is indicated by the predetermined code $C_1C_2C_3$. When a header is not being received, the sequential control circuit generates the INSERT signal in a false state so that register 73 is coupled through multiplexer 74 to the FIFO 75. Conversely, when a header is being received, control circuit 83 generates the INSERT signal in a true state so that the new header bytes HB pass through the multiplexer 74 to the FIFO 75.

Figure 7:
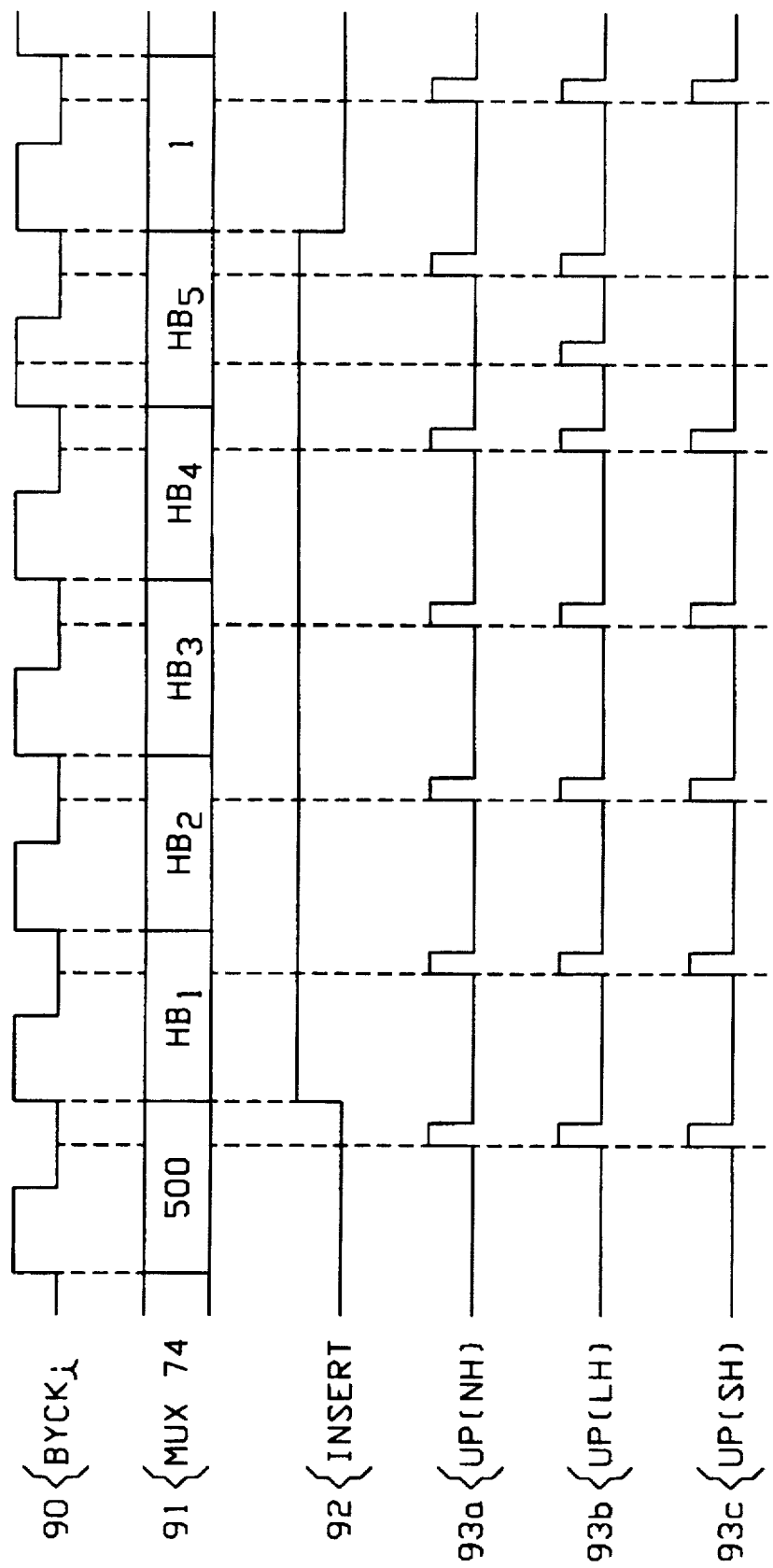
FIG. 7 is a timing diagram which illustrates several operations within the FIG. 6 repeater.

A timing diagram which illustrates the above operation is shown in FIG. 7. There, waveform 90 shows the byte clock $BYCK_i$; waveform 91 shows the content of register 73; and waveform 92 shows the INSERT signal. Further in FIG. 73, three waveforms 93a, 93b, and 93c show three different sequences of the UP signal. Sequence 93a loads a normal header into the FIFO 75; sequence 93b loads a long header into the FIFO 75; and sequence 93c loads a short header into the FIFO 75.

Each time an UP pulse occurs, counter 82 is incremented by one and a single byte is loaded from multiplexer 74 into the FIFO 75. Thus, the first pulse (left-most pulse) in waveform 93a loads data byte 500 from register 73 into the FIFO 75. Then, the second pulse in waveform 93a loads the first header byte $HB_1$ into the FIFO 75. Later, the sixth pulse of waveform 93 loads the fifth header byte. $HB_5$ into the FIFO 75; and the sixth pulse of waveform 93 loads the first data byte of another data block into the FIFO 75.

Waveform 93b is the same as waveform 93a, except that it contains two pulses during the time that the fifth header byte $HB_5$ is being sent through the multiplexer 74. Due to those two pulses, the counter 83 is incremented twice; and the fifth header byte is loaded twice into the FIFO 75. This is how a long header is generated within the FIG. 6 repeater.

Waveform 93c also is the same as waveform 93a, except that during the time that the fifth header byte is passing through the multiplexer 74, no pulses are generated in the UP signal. Consequently, counter 83 is not incremented; and no header byte is loaded into the FIFO 75. This is how, a short header is generated in the FIG. 6 repeater.

To generate the output series of bits $S_1$ on output terminal 11b, bytes are transferred from the FIFO 75 to the shift register 76 one byte at a time. Each byte which is loaded into the shift register 76 is shifted bit by bit to the output terminal 11b. This operation occurs in response to the signals $CK_o$, $BYCK_o$, and LD from the pulse generator 79.

When the enable signal EN to the pulse generator 79 is false, the clock pulses $BYCK_o$ are forced to a "0"; and consequently, no data bytes are removed from the FIFO 75. Thus, by initially generating the EN signal in a false state, the control circuit 83 can cause the FIFO 75 to fill half-way with bytes from the multiplexer 74. Thereafter, control circuit 83 generates the EN signal in a true state; and that causes the byte clock $BYCK_o$ to be generated.

To generate the down pulses DN for the counter 82, the clock signal $BYCK_o$ is sent through components 80 and 81. Component 80 is a flip-flop which is set to a "1" state each time a rising edge of the clock signal $BYCK_o$ occurs; and component 81 generates one down pulse DN if flip-flop 81 is in a "1" state when a rising edge on the signal SAMPLE occurs.

Figure 8:
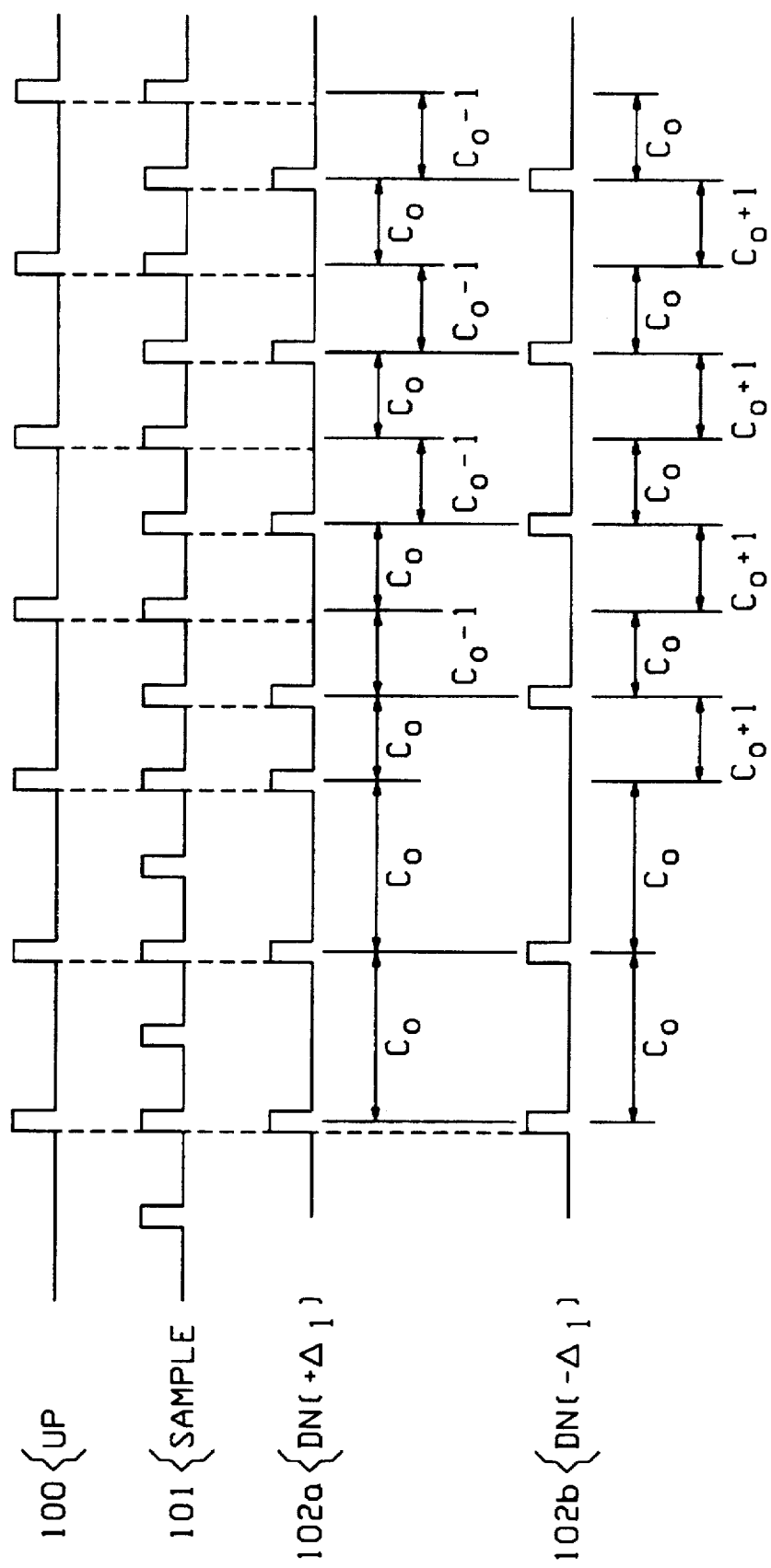
FIG. 8 is a timing diagram which illustrates another operations within the FIG. 6 repeater.

In FIG. 8, a pair of waveforms 100 and 101 respectively show the signals UP and SAMPLE. For each UP pulse in waveform 100, two SAMPLE pulses occur in waveform 101. This high pulse rate in the SAMPLE signal insures that component 82 will sense each "1" that is set in the flip-flop 81, even if the oscillator 78 is running fast due to its frequency tolerance $\Delta_2$.

Further in FIG. 8, two examples of the down pulses DN are shown by waveforms 102a and 102b. Waveform 102a occurs when the crystal oscillator 78 has a positive tolerance $\Delta_1$ and thus the clock signal $BYCK_o$ has a faster than nominal frequency. By comparison, waveform 102b occurs when the crystal oscillator 78 has a negative tolerance $\Delta_1$, and thus the clock signal $BYCK_o$ has a slower than nominal frequency.

In waveform 102a, the first (left-most) down pulse DN occurs simultaneously with the first (left-most) UP pulse in waveform 101. Due to this simultaneous occurrence of the DN pulse and UP pulse, count $C_o$ in the counter 82 remains unchanged. Likewise, the second and third down pulses DN in waveform 102a occurs simultaneously with respective UP pulses in waveform 100.

By comparison, the fourth DN pulse in waveform 102a occurs by itself with no corresponding UP pulse in waveform 100. Consequently, count $C_o$ in the counter 82 is decremented by "1"; and this indicates that the output oscillator 78 is running faster than the nominal frequency. Thereafter, the count in counter 78 switches back and forth between two counts of $C_0$ and $C_0-1$ in response to the UP and down DN pulses as shown. That operation continues for many data blocks in accordance with the normal header per long header ratios that were previously described in conjunction with column 39 of FIG. 3. But eventually, since the crystal oscillator 78 is running fast, another down DN pulse will be generated with no corresponding UP pulse.

In waveform 102b, the first two down pulses DN occur simultaneously with corresponding UP pulses occurring in waveform 100; and consequently, the count $C_0$ in counter 82 remains unchanged. But then, the third UP pulse occurs in waveform 100 with no corresponding down pulse in waveform 102b. Consequently, the count in counter 83 is incremented by "1"; and this indicates that the crystal oscillator 78 is oscillating at slower than nominal frequency. Thereafter, the count in counter 82 switches back and forth between the count of $C_0+1$ and $C_0$ as shown in FIG. 8; and this operation continues to occur for many data blocks in accordance with the normal header per short header ratios of column 39 in FIG. 3. However, since the oscillator 78 is running slow, the situation will again eventually arise where an UP pulse is generated with no corresponding down pulse.

Figure 9:
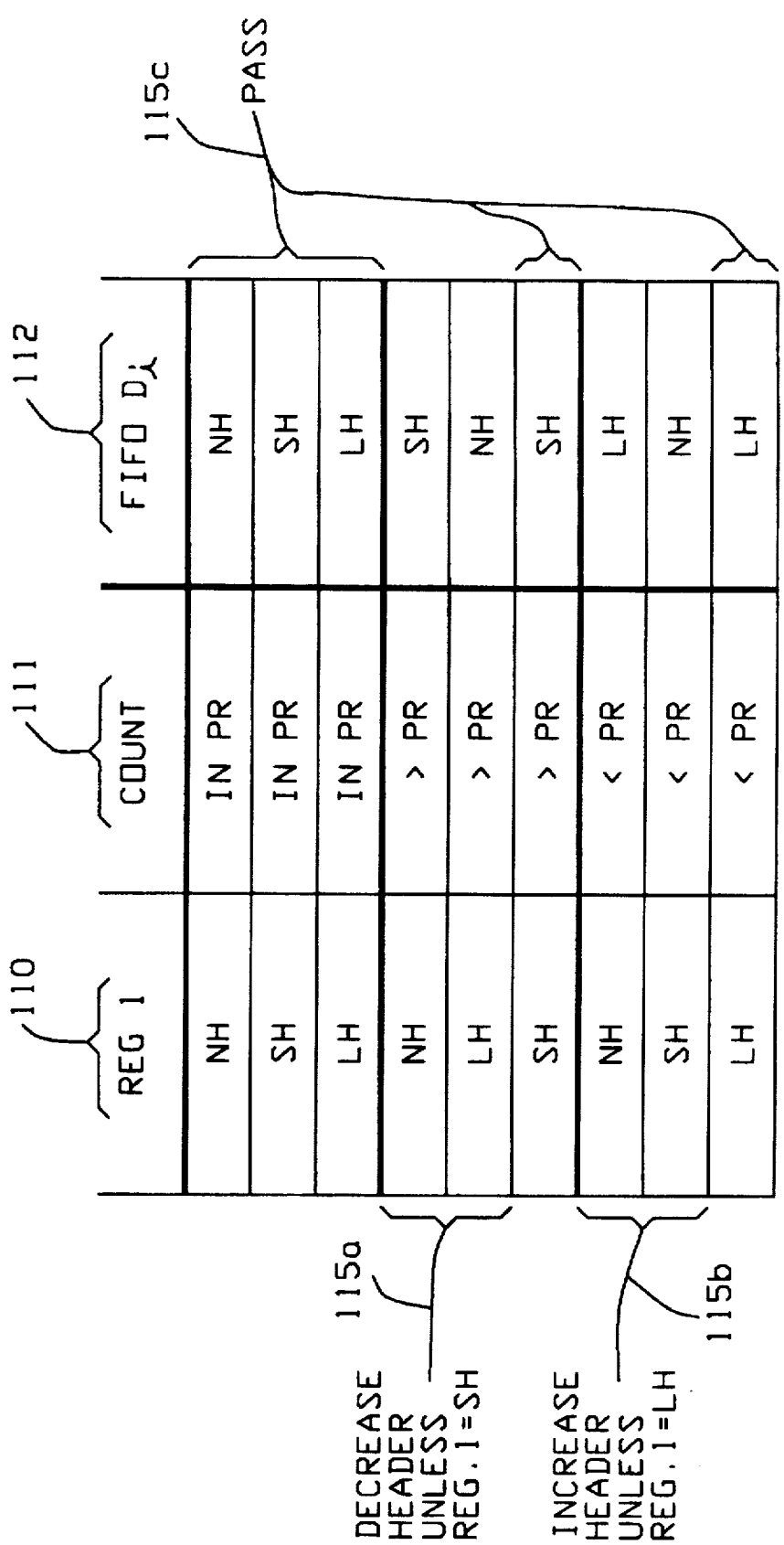
FIG. 9 is a table which illustrates the operation of a sequential control circuit within the FIG. 6 repeater.

In response to the count signal CNT from counter 82 and the bytes which are received from register 71, control circuit 83 loads either a normal header, a short header, or a long header into the FIFO 75 as shown in FIG. 9. This figure is in the form of a table which has three columns 110, 111, and 112. Column 110 shows the type of header which is received by control circuit 83 from register 71; and column 111 shows the corresponding count which is received by control circuit 83 from the counter 82. Based on those two inputs, control circuit 83 loads the header which is shown in column 112 into the FIFO 75.

For example, the top-most row in FIG. 9 indicates that when a normal header NH is received from register 1 by control circuit 83 while the count CNT from counter 82 is within a predetermined range PR, the control circuit 83 loads a normal header NH into the FIFO 75. By comparison, the fourth row from the top of the FIG. 9 table shows that when a normal header NH is received from register 1 while the count CNT is greater than the predetermined range, the control circuit 83 loads a short header SH into the FIFO 75. Conversely, the seventh row from the top of the FIG. 9 table indicates that when a normal header NH is received from register 1 while the count from the counter 82 is less than the predetermined range PR, the control circuit 83 loads a long header LH into the FIFO 75.

Inspection of the FIG. 9 table shows that the operation of the control circuit 83 can be summarized as follows. When a header is received from register 71 while the count CNT is greater than the predetermined range, a corresponding header which is shorter by one byte is generated in the FIFO 75, unless a short header was received. When a header is received from register 71 while the count from counter 82 is less than the predetermined range, a corresponding header which is longer by one byte is generated in the FIFO 75, unless a long header was received. In all other cases, the header which is received from register 71 is duplicated in the FIFO 75. This operation by the control circuit 83 is identified in FIG. 9 by reference numerals 115a, 115b, and 115c.

Preferably, before a header with a decreased length or an increased length is stored in the FIFO 75, the control circuit 83 checks the count which is received from counter 82 for several consecutive headers. For example, control circuit 83 can check the count which is received from counter 82 for twenty consecutive headers. Then, if the count for a large percentage (e.g. ~75%) of those headers is greater than the predetermined range, the action indicated by reference numeral 115a is taken; and if the count for a large percentage (e.g. ~75%) of those headers is less than the predetermined range, the action indicated by reference numeral 115b is taken. By this means, any transient fluctuations in the count signal CNT from the counter 83 will not cause unnecessary length changes between the headers that are transmitted and received.

Next, with reference to FIG. 10, a circuit which constitutes one preferred embodiment of the receiver 15 will be described. This FIG. 10 embodiment includes several circuit components, and each component is described below in TABLE 3.

TABLE 3

(Receiver Components)

| ITEM | DESCRIPTION |
|---|---|
| 120..... | Component 120 is a serial-in, parallel-out register which as a serial input 120a, a byte-wide parallel output 120b, and a clock input 120c. On the rising edge of each clock pulse that is received on input 120c, one bit is loaded into register 120 from the input terminal 120a, and the last seven bits which were previously loaded from input 120a are shifted within register 120 by one bit position. |
| 121..... 122, & 123 | Each of the components 121, 122 and 123 is a one byte register. Each register has a byte-wide input, a byte-wide output, and a clock input. One byte is loaded into each register when the rising edge of a clock pulse occurs on the clock input. |
| 124..... | Component 124 is a dual port, first-in, first-out, memory ("FIFO"). Memory 124 has a byte-wide input port 124a, a write control input 124b, and a byte-wide output port 124c, and a read control input 124d. One byte is loaded into memory 124 each time the rising edge of a pulse is received on input 124b. All bytes which are loaded into the memory 124 travel within the memory to the output port 124c in the same order in which they are loaded. A different byte is sent to the output port 124c each time the rising edge of a pulse occurs on the input 124d. Memory 124 holds a total of thirty-two bytes. |
| 125..... | Component 125 is a descrambler which has a byte-wide input and a byte-wide output. On each byte that is received, component 125 performs a descrambling operation which is the inverse of the scrambling operation that is |

TABLE 3-continued

(Receiver Components)

| ITEM | DESCRIPTION |
|---|---|
| | performed by component 43 in the FIG. 4 transmitter 10; and the result occurs on the output of component 125. |
| 126..... | Component 126 is a parallel-in, serial-out register which has a byte-wide parallel input 126a, a serial output 126b, a clock input 126c, and a load control input 126d. One byte is loaded into register 126 each time the rising edge of a clock pulse occurs on input 126c while a LD signal on input 126b is true. That byte is shifted within register 126 by one bit position to the output terminal 126b each time a clock pulse occurs on input 126c while the LD signal is false. |
| 127..... | Component 127 is phase locked oscillator (PLO) which has an input 127a, and two outputs 127b and 127c. Input 127a receives the continuous input series of data bits $S_4$; and the phase locked oscillator 127 internally has a phase locked loop which locks on to that input series of bits $S_4$. By locking on to the $S_4$ bit series, oscillator 127 is able to generate a clock signal $CK_i$ on the output 127b which oscillates at nearly the same bit rate as the bit rate $BR_4$ of the input bit series $S_4$. Oscillator 127 also searches for the code $C_1 C_2 C_3$ that occurs in each of the headers; and it generates a byte clock $BYCK_i$ on output 127c which is synchronized with that code and occurs once for every eight cycles of the bit clock $CK_i$. |
| 128..... | Component 128 is a voltage controlled oscillator (VCO) which has one input 128a and one output 128b. Input 128a receives an analog control voltage $V_c$; and in response, oscillator 128 generates a clock $CK_o$ on output 128b. As the magnitude of the analog control voltage increases, the frequency of clock $CK_o$ increases; and vice-versa. |
| 129..... | Component 129 is a pulse generator which has two inputs 129a and 129b, and two outputs 129c and 129d. Input 129a receives a clock signal $CK_o$ and input 129b receives an enable control signal EN. When the EN signal is false, the outputs 129c and 129d are at a constant "0." When the EN signal is true, output 129c generates down pulses DN which occur at one-eighth the frequency of the clock signal $CK_o$. Each pulse DN lasts for one cycle of clock $CK_o$, and during the next cycle of clock $CK_o$, a load pulse LD is generated on output 129d. |
| 130..... | Component 130 is a counter which has two inputs 130a and 130b, and one output 130c. Each time an UP pulse is received on the input 130a, the counter 130 counts up by one; and each time a DOWN pulse is received on the input 130b, the counter 130 counts down by one. Output 130c provides the net result of this up and down counting as the signal CNT. Also, logic circuitry is incorporated into the counter 130 which stops the count CNT from rolling over past a count of zero and past a maximum count. |
| 131..... | Component 131 is a count analyzer which has two inputs 131a and 131b which respectively receive the count signal CNT from counter 130, and a control signal HDR. In response to these two input signals, component 131 generates speed-up pulses SUP and slow-down pulses SDN on an output 131c, and these pulses respectively cause the analog control voltage $V_c$ for the VCO 128 to increase or decrease. When no pulses SUP or SDN are being generated, output 131c is in a high impedance state which approximates an open circuit. |
| 132..... | Component 132 is a low pass filter which has an input which receives the speed-up pulses SUP and slow-down pulses SDN; and which filters those pulses to thereby generate the analog control voltage $V_c$ for the VCO 128. |
| 133..... & 134 | Component 133 is a digital inverter, and component 134 is a two input digital AND gate. These two components, together generate the UP pulses for the counter 130 and the FIFO 124. When the control signal HDR is true, inverter 133 inhibits the clock $BYCK_i$ from passing through AND gate 134; and consequently, the UP pulses are a constant "0." When the control signal HDR is false, the clock $BYCK_i$ passes through the AND gate 133 to thereby generate the UP pulses. |
| 135..... | Component 135 is a sequential control circuit which has two inputs 135a and 135b, and two outputs 135c and 135d. Input 135a receives each byte which is held in register 121; and input 135b receives the byte clock $BYCK_i$ from the phase locked oscillator 127. In response to these two inputs, control circuit 135 generates the HDR signal on output 135c. Control signal HDR goes true when the first byte of a header is in register 123, and it goes false when the first byte of a data block is in register 123. Control signal HDR is generated within the control circuit 135 by examining the bytes which are received from register 121 to detect the predetermined code $C_1 C_2 C_3$ which indicates the start of a header, and by examining the next byte which follows that code to determined the length of the header. Control circuit 135 also generates the enable signal EN on output 135d. When the EN signal is false, no down pulses DN are generated by the pulse generator 129; and consequently, no bytes are removed from the FIFO 124. Control circuit 135 generates the EN signal in a false state to initially fill the FIFO 124 half way. Thereafter, control circuit 135 always generates the EN control signal in a true state. |

Figure 10:
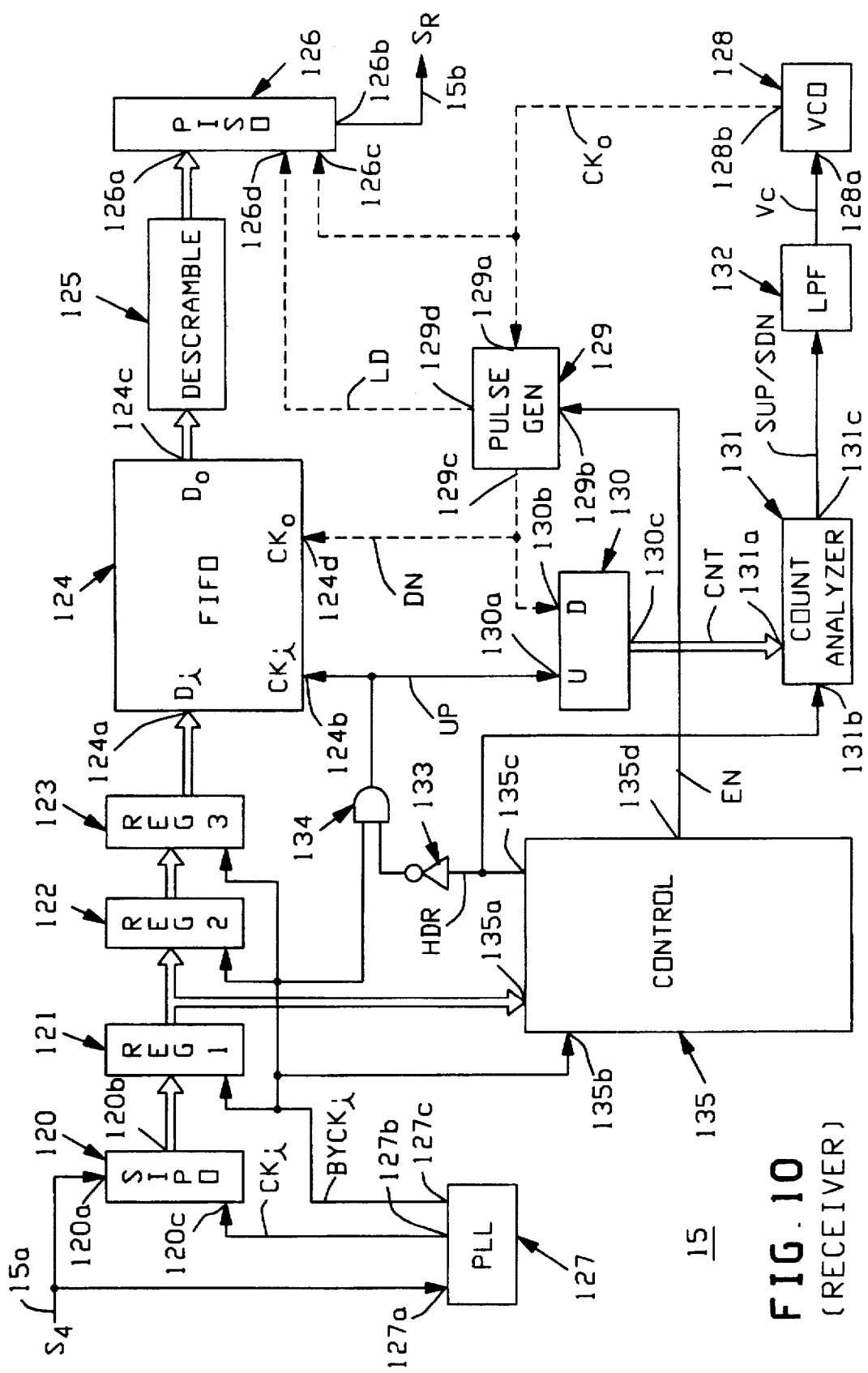
FIG. 10 is a detailed logic diagram of a preferred embodiment for a receiver within the FIG. 1 system.

All of the components 120–135 within the receiver 15 are intercoupled to each other as shown in FIG. 10; and how those components interact with each other will now be described. From input terminal 15a, the bit series $S_4$ travels one bit at a time to register 120; and from there the bits are transferred one byte at a time through registers 121, 122, and 123. Each byte that is loaded into register 121 is examined by the sequential control circuit 135 to determine if a header is being received.

While register 123 holds the first byte of a header, control circuit 135 generates the HDR signal in a true state on output 135c; and that state is maintained until register 123 holds the first byte of a data block. When the HDR signal is true, components 133 and 134 prevent the UP pulses from occurring; and consequently, the header bytes in the input series of bits $S_4$ are not loaded into the FIFO 124. Conversely, when the HDR signal in a false state, each pulse of the byte clock $BYCK_i$ passes through AND gate 134 to thereby generate a corresponding UP pulse. Each UP pulse loads one data byte from register 123 into the FIFO 124 and increments the count CNT in the counter 130 by one.

In response to each down pulse DN from the pulse generator 129, a new data byte is transferred within the FIFO 124 to the output port 124c where it is descrambled by component 125; and in addition, the count CNT from the counter 130 is decremented by one. Then, in response to each load pulse LD from the pulse generator 129, one byte of data is transferred from the descrambler 125 into the parallel-in, serial-out register 125. That byte is then shifted bit by bit to the output terminal 15b.

From the counter 130, the count signals CNT are sent to the count analyzer 131 which checks to see if the count is within a predetermined range. If the maximum count CNT gets so large that it goes outside of the predetermined range, the count analyzer 131 generates speed-up pulses SUP on output 131c such that the analog control voltage $V_c$ for the VCO 128 is slightly increased. Conversely, if the minimum count CNT falls below the predetermined range, then the count analyzer 131 generates slow down pulses SDN on output 131c such that the analog control voltage $V_c$ for the VCO is slightly decreased.

Clock signal $CK_o$ from the VCO 128 increases in frequency as the analog control voltage $V_c$ is increased; and vice-versa. By slightly increasing the frequency of the clock signal $CK_o$, a few more down pulses DN from by the pulse generator 129 occur; and thus the maximum count from the counter 130 slowly decreases. Conversely, by slightly decreasing the frequency of the clock signal $CK_o$, a few less down pulses DN from the pulse generator 129 occur; and thus the minimum count from the counter 130 slowly increases.

Figure 11:
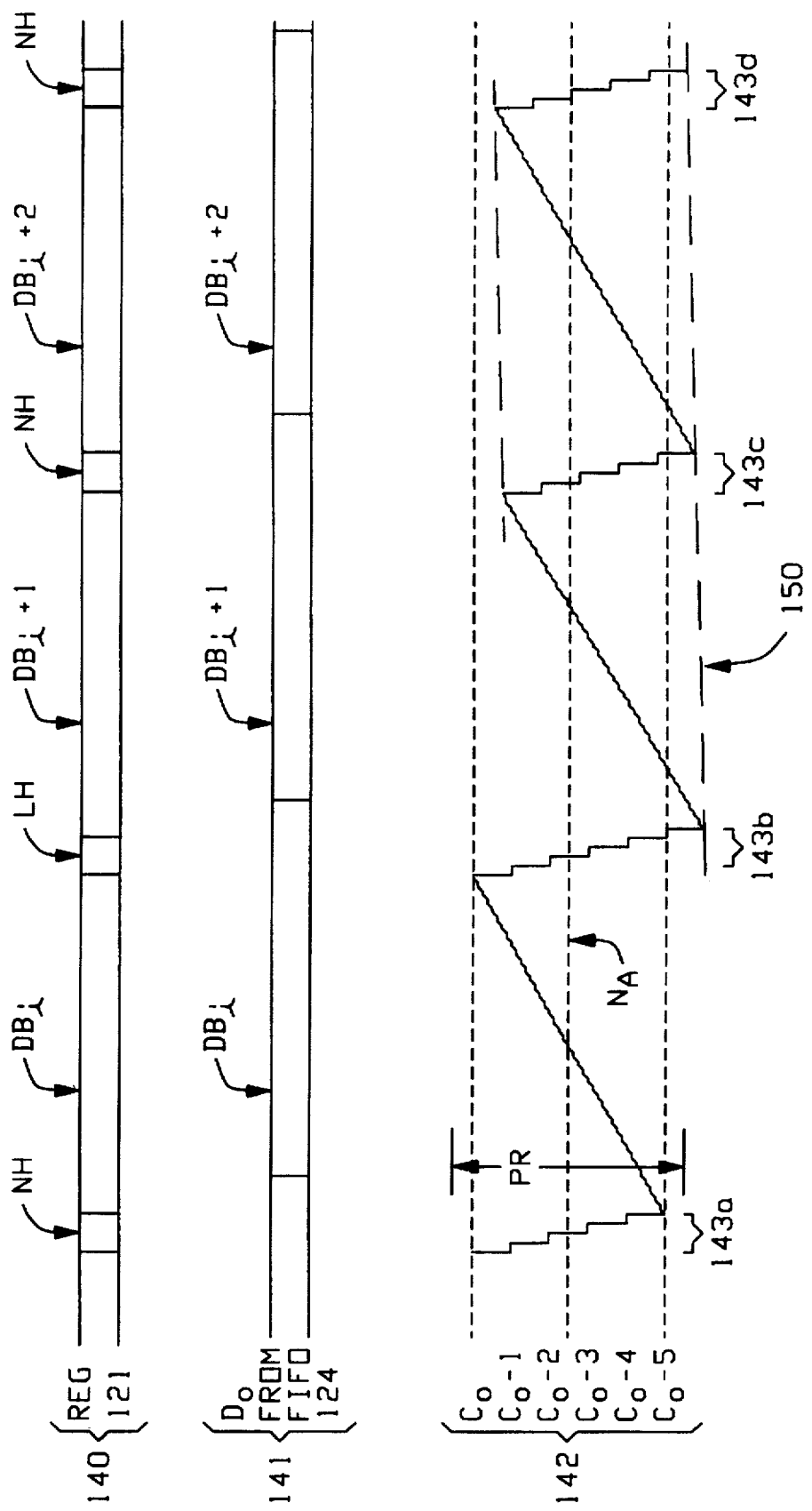
FIG. 11 is a timing diagram which illustrates an operation which occurs within the FIG. 10 receiver.

A timing diagram which illustrates the above-described operation of the FIG. 10 receiver is shown in FIG. 11. There, waveform 140 shows the content of register 121; waveform 141 shows the output from the FIFO 124; and waveform 142 shows the count CNT from the counter 130.

Initially in FIG. 11, register 121 receives a normal header NH followed by a data block $DB_i$; then register 121 receives a long header LH followed by a data block $DB_{i+1}$; and then register 121 receives a normal header NH followed by a data block $DB_{i+2}$. Due to the operation of the control circuit 135, all of the data blocks but none of the headers are loaded into the FIFO 124. Consequently, in the FIFO output as shown by waveform 141, only the data blocks occur.

During the time periods that the headers are being received, the counter 130 does not receive any UP pulses but it does receive DN pulses. Thus when the headers are being received, the counter 130 counts down; and this occurs in waveform 142 during the time intervals 143a–143d. Each time interval 143a, 143c, and 143d corresponds to the receipt of a normal header NH which is five bytes long; and consequently, during those time intervals, the counter 130 is decremented five times. By comparison, time interval 143b corresponds to the receipt of a long header which is six bytes long; and consequently during time interval 143b, the counter 130 is decremented six times.

Between the time intervals 143a–143d, the bytes of the data blocks DB are loaded into the FIFO 124 and removed therefrom. Thus, between the time intervals 143a–143d, counter 130 is both incremented and decremented. However, due to the operation of the components 128–132, the rate at which data bytes are removed from the FIFO 124 is slower than the rate at which the data bytes are loaded into the FIFO. Thus, between the time intervals 143a–143d, the count CNT in counter 130 gradually increases. This increase, together with the count decrease which occurs during the time intervals 143a–143d give the count waveform 142 a sawtooth shape.

Inspection of the sawtooth shaped waveform 142 in FIG. 11 shows that the CNT signal reaches a maximum when the header is just starting to be received; and the CNT signal reaches a minimum when the data blocks are just starting to be received. Consequently, the maximum count signal is sensed within the count analyzer 131 by sampling the count CNT when the header signal HDR switches from false to true, and the minimum count signal is sensed by sampling the count CNT when the header signal HDR switches from true to false.

If the minimum count which is sensed by the count analyzer 131 lies below the predetermined range PR, then the count analyzer 131 generates the slow down pulses SDN such that the frequency of the clock signal $CK_o$ from the voltage control oscillator 128 is decreased by just a few cycles per second. Due to this slight decrease in frequency, the minimum count will slowly rise such that after several dozen data blocks DB pass through the FIFO 124, the minimum count will again be back within the predetermined range PR. This slow increase in the minimum count indicated in FIG. 11 by reference numeral 150.

Similarly, if the maximum count which is sensed by the count analyzer 131 lies outside above the predetermined range PR, then the count analyzer 131 responds by generating the speed up pulses SUP such that the frequency of the clock signal $CK_o$ from the VCO is increased by just a few cycles per second. As a result, the maximum count will slowly decrease; and after several dozen data blocks DB pass through the FIFO, the maximum count will again be within the predetermined range.

From the above it follows that the VCO 128, the pulse generator 129, the counter 130, the count analyzer 131, and the low pass filter 132 together form a closed loop feedback circuit. This loop automatically selects the frequency of the clock signal $CK_o$ such that the count CNT from the counter 130 stays within the predetermined range PR. Consequently, the output series of bits $S_R$ is continuous even though the headers were stripped from the input series of bits $S_4$.

Further, the closed loop feedback circuit 128–132 maintains the count CNT as a sawtooth shaped waveform with a substantially constant average value $N_A$. Consequently, the bit rate of the clock signal $CK_o$ is constant and automatically matches the bit rate of the original series of bits $S_i$ which occur at the input of the transmitter 10. Thus, the output series of bits $S_R$ from the receiver 15 essentially duplicates the input series of bits $S_i$ to the transmitter 10.

It should be pointed out that during initial startup, hundreds of bytes may pass through the FIFO 124 before the clock $CK_o$ from the VCO 128 stabilizes at a substantially constant frequency. This is because the speed-up pulses SUP and slow down pulses SDN only make small changes to the frequency of the clock $CK_o$ to thereby minimize jitter. Preferably, the SUP and SDN pulses change the frequency of the clock $CK_o$ by increments of less than five-hundred parts per billion, with a total adjustment range of one hundred parts per million.

To ensure that this slowly changing clock $CK_o$ will eventually reach the proper constant frequency, the counter 130 incorporates logic circuitry which prevents the count CNT from rolling over. If the count CNT is allowed to roll past zero, the slow down pulses SDN would then switch to speed up pulses SUP; and if the count CNT is allowed to roll past a maximum count, the speed up pulses SUP would then switch to slow down pulses SDN.

One preferred embodiment of the present invention has now been described in detail. In addition, however, many changes and modifications can be made to the details from this preferred embodiment without departing from the nature and spirit of the invention; and some of those modifications will now be described.

Figure 12:
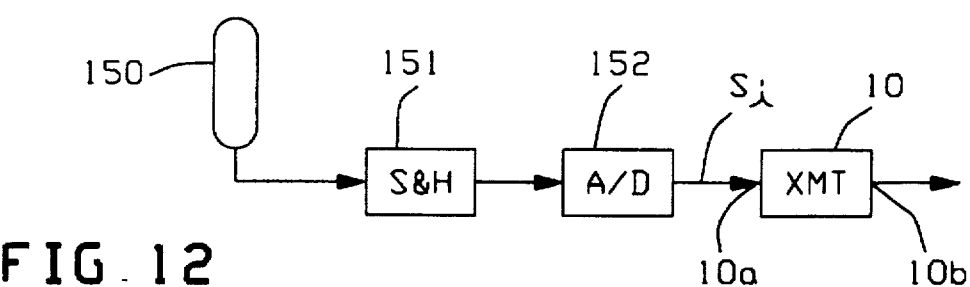
FIG. 12 shows one example of how a continuous input series of bits $S_i$ can be generated for the transmitter in the FIG. 1 system.

One modification is shown in FIG. 12 wherein the continuous input series of data bits $S_i$, which occurs on input terminal 10a of the transmitter 10, consists of digital samples of speech. These digital samples of speech are generated by a microphone 150, a sample and hold circuit 151, and an analog-to-digital converter 152 which are serially intercoupled to each other as shown in FIG. 12.

Figure 13:
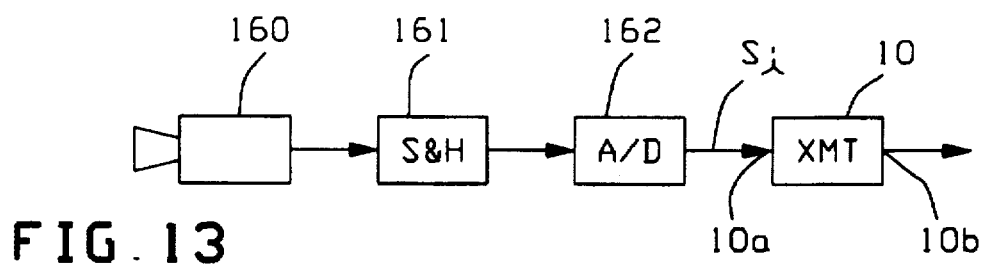
FIG. 13 shows another example of how the continuous input series of bits $S_i$ can be generated for the transmitter in the FIG. 1 system.

As another modification, the continuous input series of data bits $S_i$ which occurs on input terminal 10a of the transmitter 10 consists of pixels in successive video frames. These pixels are generated by a camera 160, a sample and hold circuit 161, and an analog-to-digital converter 162 which are serially intercoupled to each other as shown in FIG. 13.

Figure 14:
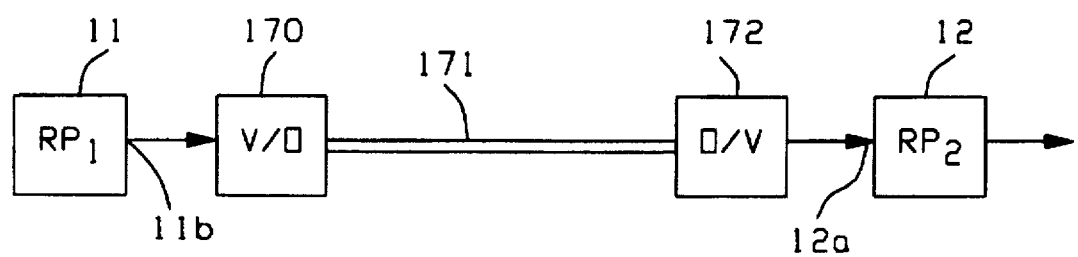
FIG. 14 shows one structure for the communication channels within the FIG. 1 system.
Figure 15:
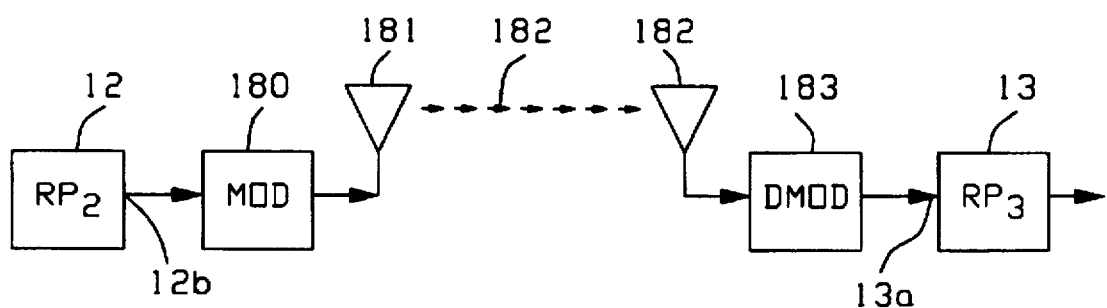
FIG. 15 shows a second structure for the communication channels in the FIG. 1 system.
Figure 16:
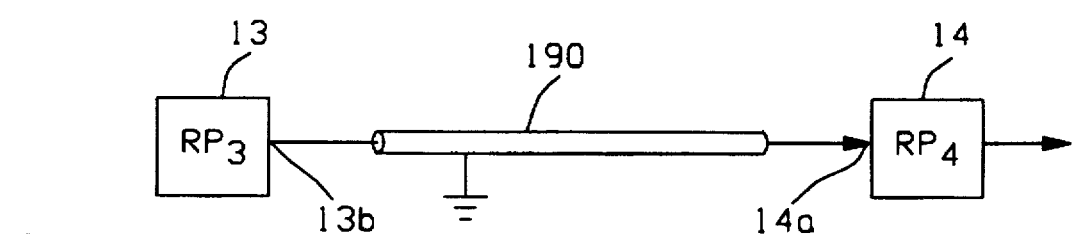
FIG. 16 shows a third structure for the communication channels in the FIG. 1 system.

As another modification, the bit serial communication channels 20–24 which intercouple the transmitter 10, the repeaters 11–14, and the receiver 15 to each other, can be optical channels, wireless channels, or electrical channels. In FIG. 14, the illustrated channel is comprised of a voltage-to-optical converter 170, an optical fibre 171, and an optical-to-voltage converter 172 which are serially intercoupled. In FIG. 15, illustrated channel is comprised of a modulator 180, a transmitting antenna 181, a wireless communication media 182, (such as air or space), a receiving antenna 182, and a demodulator 183, all of which are serially intercoupled. In FIG. 16, the illustrated channel is comprised of a co-axial cable 190.

As another modification, the transmitter 10 can be changed such that it receives a continuous stream of data bits which consists of multiple input series of bits that occur simultaneously in a bit-parallel fashion; and the receiver 15 can also be changed such that it duplicates those same bit series in an output stream from the receiver. This modification will now be described in conjunction with FIGS. 17 and 18.

FIG. 17 shows the input portion of a transmitter which is a modification to the transmitter of FIG. 4. In the FIG. 17 transmitter, the continuous input series of data bits $S_i$ is again received on input terminal 10a; and simultaneously, another continuous input series of data bits $S_i'$ is received on another input terminal 10a'. Input bit series $S_i$ is partitioned into groups of four bits by a four bit wide serial-parallel register 40a'. Simultaneously, the bit series $S_i'$ is partitioned into groups of four bits by a similar register 40b'.

From the registers 40a' and 40b', two groups of four bits each are loaded in parallel into the register 41 where they form one byte. This loading of register 41 occurs once for every four cycles of the input bit clock $CK_i$ which is generated by the phased-locked oscillator 46. Each time a new byte is loaded into register 41, the preceding byte is loaded into FIFO 42 and the counter 48 is incremented by one. All remaining circuitry within the FIG. 17 transmitter is the same as components 43, 44, 45, 49, 50, 51, 52 and 53 in the FIG. 4 transmitter.

Similarly, FIG. 18 shows the output portion of a receiver which is a modification to the FIG. 10 receiver. In the FIG. 18 receiver, bytes are loaded into the FIFO 124 in the same manner that bytes are loaded into the FIFO 124 of FIG. 10 receiver by components 120, 121, 122, 123, 127, 133, 134 and 135. Then, from the output of the descrambler 125 in the FIG. 18 receiver, each byte is partitioned into two groups of four bits each. One four-bit group is loaded into a four bit wide parallel-in, serial-out register 126a', while the other four-bit group is simultaneously loaded into similar register 126b'. That loading of the registers 126a' and 126b' occurs once for each four cycles of the output bit clock $CK_o$ which is generated by the VCO 128, since the pulse generator circuit 129' generates the down pulses DN and the load pulses LD once for every four cycles of the bit clock $CK_o$.

All of the bits which are loaded into register 126a' are shifted bit-by-bit to the output terminal 15b where they form the bit series $S_R$. Simultaneously, all of the bits which are loaded into the register 126b' are shifted bit-by-bit to another output terminal 15b' where they form an output bit series $S_R'$. Bit series $S_R$ essentially duplicates the input series of bits $S_i$ which occurs as an input to the FIG. 17 receiver; and bit series $S_R'$ essentially duplicates the bit series $S_i'$ which occurs as another simultaneous input to the FIG. 17 transmitter.

Figure 19:
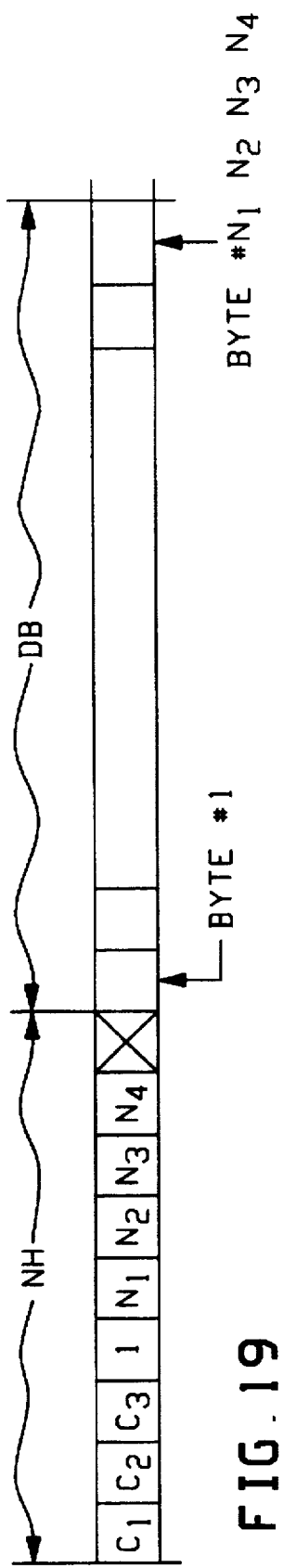
FIG. 19 shows a modification to the format for the bit series of FIG. 2 whereby the data blocks have a variable length.

As another modification, each of the headers which are sent from the transmitter 10 and the repeaters 11–14 can be changed to include a field which indicates the number of bytes that occur in the immediately following data block. An example of this modification is shown in FIG. 19, wherein the normal header NH includes a four-byte number $N_1N_2N_3N_4$ which equals the total number of bytes in the immediately following data block DB. With this modification, the number of bytes which are in a data block can vary from one data block to another.

To implement this FIG. 19 modification, the transmitter of FIG. 4 generates the number $N_1N_2N_3N_4$ as part of the header bytes HB which are sent from the sequential control circuit 53 to the multiplexer 44; and that number is also loaded into the DB counter 51. Then, within each repeater of FIG. 6, the number $N_1N_2N_3N_4$ passes from register 71 through the sequential control circuit 83 to the multiplexer 74; and circuit 83 allows the following data block of $N_1N_2N_3N_4$ bytes to go into the FIFO 75. Thereafter, within the receiver of FIG. 10, the number $N_1N_2N_3N_4$ is sent from register 121 to the sequential control circuit 135; and in response to that number, the sequential control circuit 135 generates the HDR signal in a false state for a total of $N_1N_2N_3N_4$ bytes.

Figure 20:
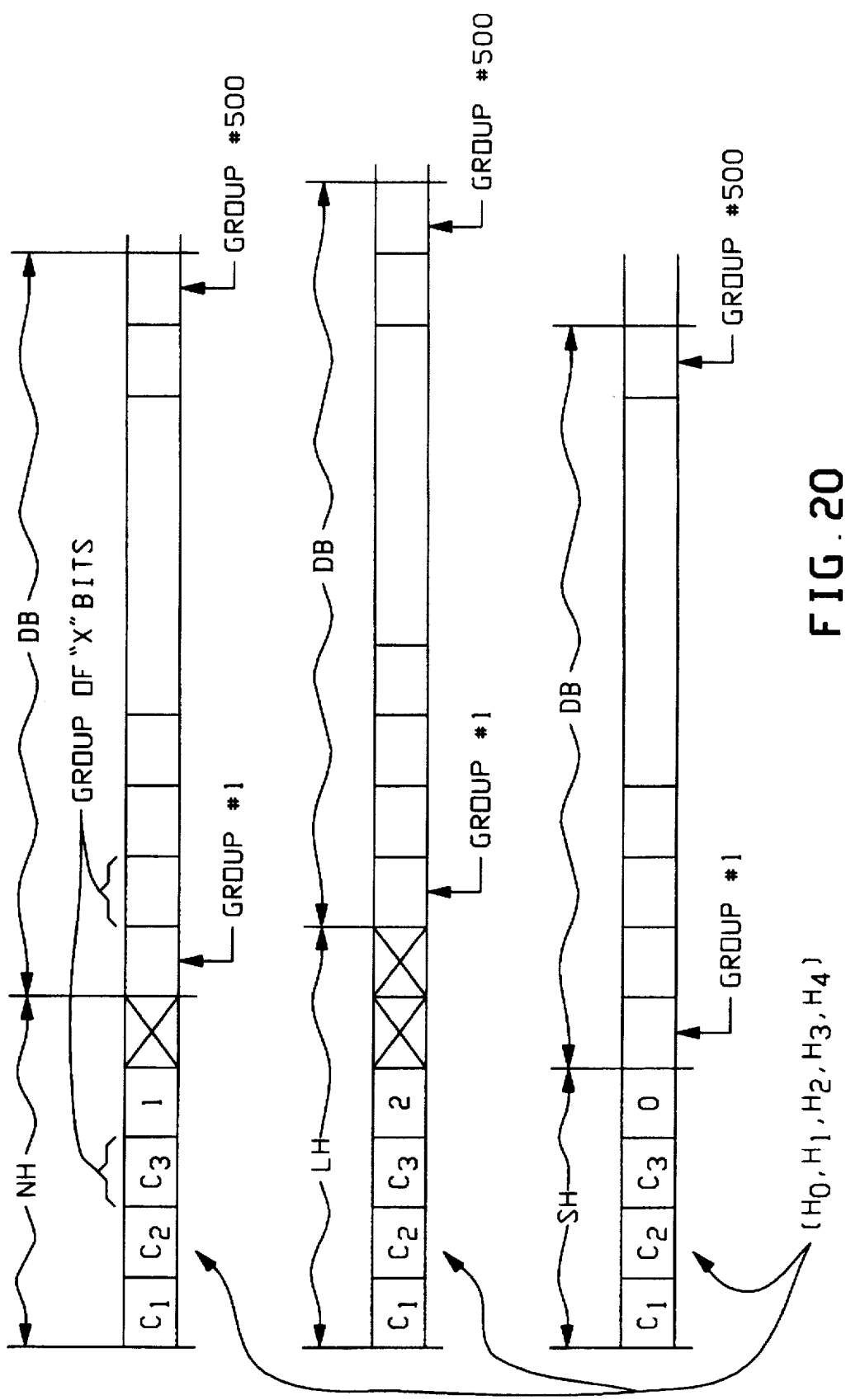
FIG. 20 shows a modification to the format for the bit series of FIG. 2 whereby the number of dummy bits which occur in a normal header and a long header respectively are X and 2X, where X is any positive integer.

As another modification, the number of dummy bits which are in a normal header NH and a long header LH can respectively be any number X and 2X; where X preferably is an integer which ranges from 1–64. This modification is shown in FIG. 20 wherein each square represents a group of X bits rather an eight-bit byte. Thus, the normal header NH contains X dummy bits, the long header LH contains 2X dummy bits, the control code $C_1C_2C_3$ is three groups of X bits, and the data block DB is several consecutive groups of X bits each.

To implement this modification in the FIG. 4 transmitter, all of the components 40 through 45 are changed to be X bits wide rather than one byte wide; counter 47 becomes a divide by X counter; and pulse generator 50 generates the LD pulse and $BYCK_o$ pulse once for every X cycles of the clock $CK_o$. Similarly to implement this modification in the FIG. 6 repeater, all of the components 70 through 76 are changed to be X bits wide rather than one byte wide; phase locked loop 77 generates the clock $BYCK_i$ once for every X cycles of the bit clock $BYCK_i$; and the pulse generator 79 generates the LD pulse and $BYCK_o$ pulse once for every X cycles of the clock $CK_o$. Likewise to implement this modification in the FIG. 10 receiver, all of the components 120 through 126 are changed to be X bits wide rather than one byte wide; the phase locked oscillator 127 generates the $BYCK_i$ pulses once for every X cycles of the clock $CK_i$; and pulse generator 129 generates the LD pulse and DN pulse once for every X cycles of the clock $CK_o$.

As another modification, the dual port FIFO which is included in the transmitter 10, the repeaters 11–14, and the receiver 15 can have practically any desired storage capacity. However, due to the manner in which the count CNT in the transmitter, the repeaters, and the receiver, is kept within a predetermined range, a FIFO with a large storage capacity is not needed; and that in turn reduces the corresponding cost of the FIFO. Thus, the FIFO within the transmitter, the repeaters, and the receiver, preferably has a storage capacity of less than 64 bytes.

Figure 21:
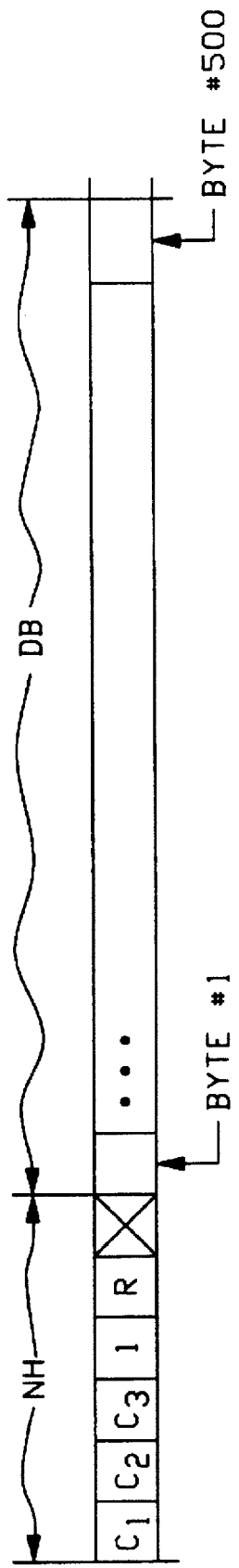
FIG. 21 shows another modification to the format for the bit series of FIG. 2 whereby multiple receivers can selectively receive the data blocks; and, FIG. 22 shows still another modification to the format for the bit series of FIG. 2 whereby multiple receivers can selectively receive respective portions of each data block.

As another modification, the data processing system of FIG. 1 can be modified to include multiple receivers 15, each of which have an input terminal 15a that is coupled to one of the channels 20–24. In such a system, all of those receivers can regenerate the transmitter input series of data bits $S_i$ on their output terminal 15b in the same manner as the previously described receiver 15 of FIG. 10. Alternatively, the headers which are sent from the transmitter 10 and the repeaters 11–14 can be changed to include a field which indicates that the immediately following data block is to be received by only a particular one of the receivers; and this modification is shown in FIG. 21. There, each of the headers includes a field "R" which identifies one particular receiver that is to receiver the immediately following data block DB.

To implement this modification, the FIG. 10 receiver is changed such that the sequential control circuit 135 examines the field R in each header as it is held in register 121. If that field R matches a particular number which is assigned to the receiver, the control circuit 135 generates the header signal HDR in a false state to pass the immediately following data block DB into the FIFO 124. Otherwise, if a mismatch occurs, the sequential control circuit 135 keeps the header signal HDR in a true state while the immediately following data block DB passes through register 123. To allow for the irregular manner in which data is loaded into the FIFO 124, the storage capacity of that FIFO and the predetermined range PR may have to be increased to more than 64 bytes.

Figure 22:
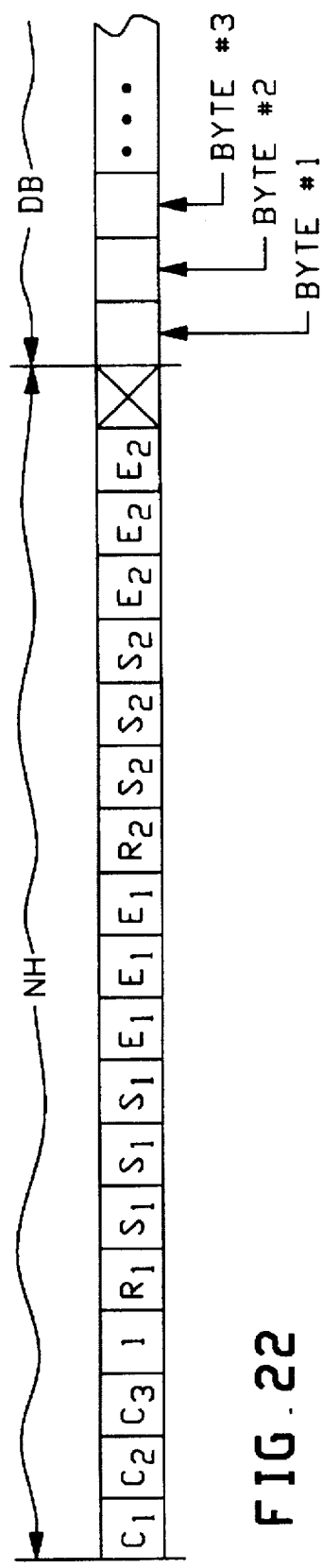

As another modification, the headers which are sent from the transmitter 10 and the repeaters 11–14 can be modified to include fields which identifies certain portions of each data block which are to be received by the various receivers. An example of this modification is shown in FIG. 22. There, the field $S_1S_1S_1$ specifies the number of the byte in the immediately following data block at which the receiver $R_1$ starts its receiving operation; and the field $E_1E_1E_1$ specifies the number of the byte in the data block at which the receiver $R_1$ ends its receiving operation. Similarly, the field $S_2S_2S_2$ specifies the number of the byte in the immediately following data block DB at which the receiver $R_2$ starts its receiving operation and the field $E_2E_2E_2$ specifies the number of the byte in the data block at which the receiver $R_2$ ends its receiving operation.

To implement this modification, the FIG. 10 receiver is changed such that the sequential control circuit 135 monitors the header characters as they are held in register 121. If a match is found between the header field $R_1$ and a number which is assigned to the receiver, then the sequential control circuit 135 generates the header signal HDR in a false state while the characters #$S_1S_1S_1$ through #$E_1E_1E_1$ of the immediately following data block DB are held in register 123. Similarly, if the sequential control circuit 135 finds a match between the header field $R_2$ and a number which is assigned to the receiver, then the sequential control circuit 135 generates the header signal HDR in a false state while the characters #$S_2S_2S_2$ through #$E_2E_2E_2$ are held in register 123. Here again, to allow for the irregular manner in which data is loaded into the FIFO 124, the storage capacity of that FIFO and the predetermined range PR may have to be increased to more than 64 bytes.

With the above two modifications of FIGS. 21 and 22, the output series of bits $S_R$ from the FIG. 10 receiver will still be continuous and the bit rate $BR_R$ will still be substantially constant. This result occurs due to the operation of the closed loop feedback control circuit which is formed by components 128–132 in the FIG. 10 receiver. However, the receiver output bit rate $BR_R$ will no longer equal the transmitter input bit rate $BR_i$. Instead, bit rate $BR_R$ will equal the one particular constant rate which keeps the count CNT from the counter 130 within the predetermined range PR.

As another modification, the digital communication system of FIG. 1 can be modified such that any number of repeaters serially interconnect the transmitter 10 to the receiver 15. Alternatively, the FIG. 1 digital communication system can be modified such that the transmitter 10 is connected directly to the receiver 15 with no repeaters there between.

As another modification, the independent oscillator 49 within the transmitter 10 and the independent oscillator 78 within the repeaters 11–14 need not be a crystal oscillator. Instead, those oscillators 49 and 78 can be any oscillator that generates highly stable clock signals independent of the phased-locked oscillators 46 and 77 which also are in the transmitter and the repeaters respectively. For example, the oscillators 49 and 78 can be a Cesium atomic clock, or a ceramic resonator.

As another modification, the sequential control circuits 53, 83, 135, which are respectively in the FIG. 4 transmitter, the FIG. 6 repeater, and the FIG. 10 receiver can be implemented as a special purpose sequential state machine, or a programmable microprocessor.

Accordingly, since many such modifications can be made to the details of the illustrated preferred embodiments, it is to be understood that the present invention is not limited to those details, but is defined by the appended claims.

What is claimed is:

1. An electronic receiver which is comprised of:
    an input terminal which receives a continuous series of bits at a receiver input bit rate which consists of data bits in spaced apart data blocks with respective headers that have a variable length and fill the space between said data blocks;
    a digital logic circuit followed by a single input-single output memory which are coupled in series between said input terminal and an output port;
    where said digital logic circuit generates control signals which cause said memory to store only selected bits from said data blocks but no bits from said headers; and,
    a closed loop feedback control circuit, coupled to said memory, which selects a receiver output bit rate that is substantially constant and reads the stored bits from said memory onto said output port as a continuous bit stream at said substantially constant output bit rate such that the number of bits in said memory stays within a predetermined range regardless of said input bit rate.

2. A receiver according to claim 1 herein said closed loop feedback control circuit further includes a counter circuit, coupled to said memory, which generates a count signal that is representative of the number of data bits stored in said memory; and an oscillator, coupled from said counter circuit to said memory, which responds to said count signal by selecting said substantially constant output bit rate in a manner which maintains said count within a predetermined range.

3. A receiver according to claim 2 wherein said oscillator generates clock signals that read said stored portions of said selected bits from said memory; and wherein said oscillator generates said clock signals with a decrease in frequency when said count falls below said predetermined range, and with an increase in frequency when said count rises above said predetermined range.

4. A receiver according to claim 3 wherein said oscillator increases and decreases the frequency of said clock signals in increments of less than five-hundred parts per billion.

5. A receiver according to claim 4 wherein said counter circuit stops counting down when it reaches a lower limit, and stops counting up when it reaches an upper limit.

6. A receiver according to claim 1 wherein said memory, at any one time instant, stores no more than five-hundred-twelve of said selected bits from said data blocks.

7. A receiver according to claim 1 wherein said data bits which are received in blocks, and sent as a continuous stream to said output port, are digital samples of continuous speech.

8. A receiver according to claim 1 wherein said data bits which are received in blocks, and sent as a continuous stream to said output port, are pixels in successive video frames.

9. A receiver according to claim 1 wherein said variable length headers have N or N+X or N−X bits, where N and X are integers.

10. A receiver according to claim 1 wherein each of said data blocks hold the same number of data bits.

11. A receiver according to claim 1 wherein said data blocks hold different numbers of data bits.

12. A receiver according to claim 1 wherein said output port is a single terminal on which said output stream of data bits is sent in a bit serial fashion.

13. A receiver according to claim 1 wherein said output port has multiple terminals on which said output stream of data bit is sent in a bit parallel fashion.

14. A receiver according to claim 1 wherein said output stream of data bits consists of all of said data bits in all of said data blocks.

15. A receiver according to claim 1 wherein said output stream of data bits consists of all said data bits in selected ones of said data blocks.

16. A receiver according to claim 1 wherein said output stream of data bits consists of selected data bits in all of said data blocks.

\* \* \* \* \*